US008552124B2

(12) United States Patent
Hansen et al.

(10) Patent No.: US 8,552,124 B2
(45) Date of Patent: *Oct. 8, 2013

(54) COPOLYMERS WITH PERFLUOROPOLYETHER SEGMENT AND POLYDIORGANOSILOXANE SEGMENT

(75) Inventors: Richard G. Hansen, Mahtomedi, MN (US); Miguel A. Guerra, Woodbury, MN (US); David S. Hays, Woodbury, MN (US); Suresh S. Iyer, Woodbury, MN (US); Ramesh C. Kumar, Woodbury, MN (US); George G. I. Moore, Afton, MN (US); Yu Yang, Eden Prairie, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/514,339

(22) PCT Filed: Dec. 22, 2010

(86) PCT No.: PCT/US2010/061787
§ 371 (c)(1),
(2), (4) Date: Jun. 7, 2012

(87) PCT Pub. No.: WO2011/082063
PCT Pub. Date: Jul. 7, 2011

(65) Prior Publication Data
US 2012/0264890 A1     Oct. 18, 2012

Related U.S. Application Data

(60) Provisional application No. 61/291,033, filed on Dec. 30, 2009.

(51) Int. Cl.
C08F 283/12 (2006.01)
C08G 77/388 (2006.01)

(52) U.S. Cl.
USPC .............................. 525/474; 528/25; 528/425

(58) Field of Classification Search
USPC ..................................... 525/474; 528/25, 425
See application file for complete search history.

(56) References Cited

U.S. PATENT DOCUMENTS

| | | | |
|---|---|---|---|
| 2,343,808 A | 3/1944 | Schlack | |
| 3,250,807 A | 5/1966 | Fritz | |
| 3,392,097 A | 7/1968 | Gozzo | |
| 3,442,942 A | 5/1969 | Sianesi | |
| 3,485,806 A | 12/1969 | Bloomquist | |
| 3,699,145 A | 10/1972 | Sianesi | |
| 3,715,378 A | 2/1973 | Sianesi | |
| 3,728,311 A | 4/1973 | Park | |
| 3,810,874 A | 5/1974 | Mitsch | |
| 3,890,269 A | 6/1975 | Martin | |
| 4,085,137 A * | 4/1978 | Mitsch et al. | 428/835.8 |
| 4,119,615 A * | 10/1978 | Schulze | 528/343 |
| 4,661,577 A | 4/1987 | Jo Lane | |
| 4,684,728 A | 8/1987 | Möhring | |
| 5,026,890 A | 6/1991 | Webb | |
| 5,093,432 A | 3/1992 | Bierschenk | |
| 5,214,119 A | 5/1993 | Leihr | |
| 5,266,650 A | 11/1993 | Guerra | |
| 5,276,122 A | 1/1994 | Aoki | |
| 5,461,134 A | 10/1995 | Leir | |
| 5,488,142 A | 1/1996 | Fall | |
| 5,512,650 A | 4/1996 | Leir | |
| 5,663,127 A | 9/1997 | Flynn | |
| 6,313,335 B1 | 11/2001 | Roberts | |
| 6,355,759 B1 * | 3/2002 | Sherman et al. | 528/28 |
| 6,441,118 B2 * | 8/2002 | Sherman et al. | 528/28 |
| 6,511,721 B1 | 1/2003 | Murata | |
| 6,923,921 B2 | 8/2005 | Flynn | |
| 7,335,786 B1 | 2/2008 | Iyer | |
| 7,371,464 B2 * | 5/2008 | Sherman et al. | 428/447 |
| 7,501,184 B2 | 3/2009 | Leir | |
| 7,745,653 B2 | 6/2010 | Iyer | |
| 7,883,652 B2 | 2/2011 | Leir | |
| 2007/0148474 A1 | 6/2007 | Leir | |
| 2007/0149745 A1 | 6/2007 | Leir | |
| 2008/0318057 A1 | 12/2008 | Sherman | |
| 2008/0318058 A1 | 12/2008 | Sherman | |
| 2011/0092638 A1 * | 4/2011 | Leir et al. | 524/588 |
| 2012/0259088 A1 * | 10/2012 | Iyer et al. | 528/343 |
| 2012/0271025 A1 * | 10/2012 | Hays et al. | 528/26 |
| 2012/0289736 A1 * | 11/2012 | Yang et al. | 560/168 |
| 2013/0012667 A1 * | 1/2013 | Hansen et al. | 525/477 |

FOREIGN PATENT DOCUMENTS

| | | |
|---|---|---|
| EP | 0165059 | 12/1985 |
| EP | 1388556 | 2/2004 |
| EP | 2096133 | 9/2009 |
| WO | WO 96/34030 | 10/1996 |

(Continued)

OTHER PUBLICATIONS

De Abajo, "Carbon-13 NMR Sequence Analysis. 23. Synthesis and NMR Spectroscopic Characterization of Polyoxamides with Alternating and Random Sequences of Aliphatic Diamines", Journal of Macromolecular Science, Chemistry, 1984, vol. A21, No. 4, pp. 411-426.

Gaade, "The Interaction of Diethyl Oxalate and Ethane Diamine", Recueil des Travaux Chimiques des Pays-Bas, Jan. 25, 1936, vol. 55, pp. 325-230.

(Continued)

*Primary Examiner* — Mike M Dollinger

(74) *Attorney, Agent, or Firm* — Jean A. Lown

(57) ABSTRACT

Copolymers containing at least one perfluoropolyether segment and at least one polydiorganosiloxane segments are described. The copolymers further contain multiple aminooxalylamino groups that link the various segments together. Methods of making the copolymers are also described.

21 Claims, No Drawings

(56) References Cited

FOREIGN PATENT DOCUMENTS

| | | |
|---|---|---|
| WO | WO 2004/034139 | 4/2004 |
| WO | WO 2005/003210 | 1/2005 |
| WO | WO 2007/073502 | 6/2007 |
| WO | WO 2007/075317 | 7/2007 |
| WO | WO 2007/075802 | 7/2007 |
| WO | WO 2007/082046 | 7/2007 |
| WO | WO 2008/027594 | 3/2008 |
| WO | WO 2009/002611 | 12/2008 |

OTHER PUBLICATIONS

Gaade, "Esters of Ethane-1 : 2-Dioxamic Acid and Their Derivatives II", Recueil des Travaux Chimiques des Pays-Bas, Jan. 25, 1936, vol. 55, pp. 541-559.

Vogl, "Polyoxamides. I. Preparation and Characterization of Cyclic Oxamides", Macromolecules, Jul.-Aug. 1968, vol. 1, No. 4, pp. 311-315.

International Search Report for PCT/US2010/061787, 3 pages.

* cited by examiner

COPOLYMERS WITH PERFLUOROPOLYETHER SEGMENT AND POLYDIORGANOSILOXANE SEGMENT

CROSS REFERENCE TO RELATED APPLICATIONS

This application is a national stage filing under 35 U.S.C. 371 of PCT/US2010/061787, filed Dec. 22, 2010, which claims priority to U.S. Provisional Application No. 61/291,033, filed Dec. 30, 2009, the disclosure of which is incorporated by reference in its/their entirety herein.

TECHNICAL FIELD

Copolymers containing at least one perfluoropolyether segment, at least one polydiorganosiloxane segment, and multiple aminooxalylamino groups are described.

BACKGROUND

Fluorinated polymeric materials such as those containing perfluoropolyether segments have been used in applications where low surface energy materials and/or low refractive index materials are desired.

Polymeric materials with polydiorganosiloxane segments and oxalylamino groups have been prepared. These polymeric materials can be used, for example, to prepare adhesive compositions and various types of polymeric films.

SUMMARY

Copolymers containing at least one perfluoropolyether segment and at least one polydiorganosiloxane segments are described. The copolymers further contain multiple aminooxalylamino groups that link the various segments together. Methods of making the copolymers are also described. The copolymers can be used, for example, in applications where low surface energy materials and/or low refractive index materials are desired.

In a first aspect, a copolymer is provided. The copolymer includes a product of a reaction mixture that includes a fluorinated oxalylamino-containing compound and silicone-based amine. The fluorinated oxalylamino-containing compound includes a perfluoropolyether segment and at least two monovalent oxalylamino-containing groups of Formula (I).

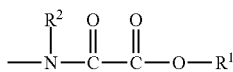

(I)

In Formula (I), each $R^1$ is independently an alkyl, haloalkyl, aralkyl, substituted aralkyl, alkenyl, aryl, substituted aryl, or imino of formula $-N=CR^4R^5$. Each $R^2$ is independently hydrogen, alkyl, aralkyl, or aryl. Group $R^4$ is hydrogen, alkyl, aralkyl, substituted aralkyl, aryl, or substituted aryl. Group $R^5$ is alkyl, aralkyl, substituted aralkyl, aryl, or substituted aryl. The silicone-based amine contains a polydiorganosiloxane segment and at least two primary amino groups, at least two secondary amino groups, or at least one primary amino group plus at least one secondary amino group.

In a second aspect, a copolymer is provided. The copolymer includes a product of a silicone-based oxalylamino-containing compound and a fluorinated amine. The silicone-based oxalylamino-containing compound contains a polydiorganosiloxane segment and at least two monovalent oxalylamino-containing groups of Formula (I).

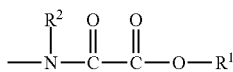

(I)

In Formula (I), each $R^1$ is independently an alkyl, haloalkyl, aralkyl, substituted aralkyl, alkenyl, aryl, substituted aryl, or imino of formula $-N=CR^4R^5$. Each $R^2$ is independently hydrogen, alkyl, aralkyl, or aryl. Group $R^4$ is hydrogen, alkyl, aralkyl, substituted aralkyl, aryl, or substituted aryl. Group $R^5$ is alkyl, aralkyl, substituted aralkyl, aryl, or substituted aryl. The fluorinated amine contains a perfluoropolyether segment and at least two primary amino groups, at least two secondary amino groups, or at least one primary amino group plus at least one secondary amino group.

In a third aspect, a copolymer is provided. The copolymer includes a product of a reaction mixture that includes an oxalate compound, a fluorinated amine compound, and a silicone-based amine compound. The oxalate compound is of Formula (VI).

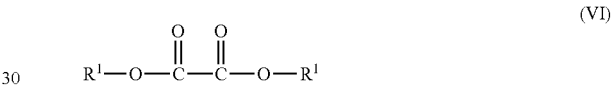

(VI)

In Formula (VI), each $R^1$ is independently an alkyl, haloalkyl, aralkyl, substituted aralkyl, alkenyl, aryl, substituted aryl, or imino of formula $-N=CR^4R^5$. Group $R^4$ is hydrogen, alkyl, aralkyl, substituted aralkyl, aryl, or substituted aryl. Group $R^5$ is alkyl, aralkyl, substituted aralkyl, aryl, or substituted aryl. The fluorinated amine contains a perfluoropolyether segment and at least two primary amino groups, at least two secondary amino groups, or at least one primary amino group plus at least one secondary amino group. The silicone-based amine contains a polydiorganosiloxane segment and at least two primary amino groups, at least two secondary amino groups, or at least one primary amino group plus at least one secondary amino group.

In a fourth aspect, a copolymer is provided. The copolymer contains at least one group of Formula (XI).

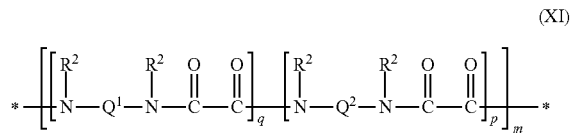

(XI)

In Formula (XI), each group $Q^1$ contains a perfluoropolyether segment and each group $Q^2$ contains a polydiorganosiloxane segment. Each $R^2$ is independently hydrogen, alkyl, aralkyl, or aryl. Each variable q, p, and m is independently an integer equal to at least 1. Each asterisk denotes a site of attachment to another group in the copolymer.

The above summary is not intended to describe each disclosed embodiment or every implementation of the present invention. The description that follows more particularly exemplifies illustrative embodiments. In several places through the description, guidance is provided through lists of examples, which can be used in various combinations. In each instance, unless stated to the contrary, the recited list serves only as a representative group and should not be interpreted as an exclusive list.

DETAILED DESCRIPTION

Copolymers containing perfluoropolyether segments and polydiorganosiloxane segments are described. The copolymers further include at least two aminooxalylamino groups. Methods of making the copolymers are also described.

DEFINITIONS

The terms "a", "an", and "the" are used interchangeably with "at least one" to mean one or more of the elements being described.

The term "and/or" means either or both. For example, the expression X and/or Y means X, Y, or a combination thereof (both X and Y).

The term "alkyl" refers to a monovalent group that is a radical of an alkane, which is a saturated hydrocarbon. The alkyl can be linear, branched, cyclic, or combinations thereof and typically has 1 to 20 carbon atoms. In some embodiments, the alkyl group contains 1 to 18, 1 to 12, 1 to 10, 1 to 6, or 1 to 4 carbon atoms. Examples of alkyl groups include, but are not limited to, methyl, ethyl, n-propyl, isopropyl, n-butyl, isobutyl, tert-butyl, n-pentyl, n-hexyl, cyclohexyl, n-heptyl, n-octyl, ethylhexyl, and octadecyl.

The term "alkylene" refers to a divalent group that is a radical of an alkane. The alkylene can be straight-chained, branched, cyclic, or combinations thereof. The alkylene typically has 1 to 20 carbon atoms. In some embodiments, the alkylene contains 1 to 18, 1 to 12, 1 to 10, 1 to 8, 1 to 6, or 1 to 4 carbon atoms. The radical centers of the alkylene can be on the same carbon atom (i.e., an alkylidene) or on different carbon atoms.

The term "fluorinated alkylene" refers to an alkylene having at least one hydrogen atom replaced with a fluorine atom. Perfluoroalkylenes are a subset of fluorinated alkylenes.

The term "alkoxy" refers to a monovalent group of formula —OR where R is an alkyl group.

The term "alkoxycarbonyl" refers to a monovalent group of formula —(CO)OR where (CO) denotes a carbonyl group and R is an alkyl group.

The term "alkenyl" refers to a monovalent group that is a radical of an alkene, which is a hydrocarbon with at least one carbon-carbon double bond. The alkenyl can be linear, branched, cyclic, or combinations thereof and typically contains 2 to 20 carbon atoms. In some embodiments, the alkenyl contains 2 to 18, 2 to 12, 2 to 10, 4 to 10, 4 to 8, 2 to 8, 2 to 6, or 2 to 4 carbon atoms. Exemplary alkenyl groups include ethenyl, 1-propenyl, and 1-butenyl.

The term "arene" refers to a carbocylic aromatic compound.

The term "aryl" refers to a monovalent group that is aromatic and carbocyclic. The aryl can have one to five rings that are connected to or fused to the aromatic ring. The other ring structures can be aromatic, non-aromatic, or combinations thereof. Examples of aryl groups include, but are not limited to, phenyl, biphenyl, terphenyl, naphthyl, acenaphthyl, anthraquinonyl, phenanthryl, anthracenyl, pyrenyl, perylenyl, and fluorenyl.

The term "substituted aryl" refers to an aryl substituted with one or more groups selected from halo, alkyl, haloalkyl, alkoxy, or alkoxycarbonyl.

The term "aralkyl" refers to a monovalent group of formula —R—Ar where R is an alkylene and Ar is an aryl group. That is, the aralkyl is an alkyl substituted with an aryl. The term "substituted aralkyl" refers to an aralkyl substituted with one or more groups selected from halo, alkyl, haloalkyl, alkoxy, or alkoxycarbonyl. The aryl portion of the aralkyl is typically the group that is substituted.

The term "aralkylene" refers to a divalent group of formula —R—Ar$^a$— where R is an alkylene and Ar$^a$ is an arylene (i.e., an alkylene is bonded to an arylene).

The term "halo" refers to fluoro, chloro, bromo, or iodo.

The term "haloalkyl" refers to an alkyl having at least one hydrogen atom replaced with a halo. Some haloalkyl groups are fluoroalkyl groups, chloroalkyl groups, or bromoalkyl groups.

The term "halocarbonyl" refers to a monovalent group of formula —(CO)X where (CO) denotes a carbonyl and X is halo.

As used herein, the term "imino" refers to a group of formula —N=CR$^4$R$^5$ where the R$^4$ group is hydrogen, alkyl, aralkyl, substituted aralkyl, aryl, or substituted aryl and the R$^5$ group is alkyl, aralkyl, substituted aralkyl, aryl, or substituted aryl.

The term "heteroalkylene" refers to a divalent group that includes at least two alkylene groups connected by a thio, oxy, or —NR$^2$— where R$^2$ is hydrogen, alkyl, aryl, or aralkyl. The heteroalkylene can be linear, branched, cyclic, or combinations thereof and can include up to 60 carbon atoms and up to 15 heteroatoms. In some embodiments, the heteroalkylene includes up to 50 carbon atoms, up to 40 carbon atoms, up to 30 carbon atoms, up to 20 carbon atoms, or up to 10 carbon atoms. Some heteroalkylene groups are polyalkylene oxide groups where the heteroatoms are oxygen.

The term "perfluoropolyether" refers to divalent group or segment of formula —(C$_x$F$_{2x}$—O—)$_y$— where x is an integer in the range of 1 to 10 and y is an integer equal to at least 2. The integer x is often in the range of 1 to 8, in the range of 1 to 6, in the range of 1 to 4, in the range of 2 to 4, equal to 3, or equal to 4. The integer y is often at least 3, at least 4, at least 8, at least 12, at least 16, at least 20, at least 30, at least 40, or at least 50.

The term "perfluoroalkylene" refers to an alkylene in which all of the hydrogen atoms are replaced with fluorine atoms.

The term "polydiorganosiloxane" refers to a divalent group or segment of formula

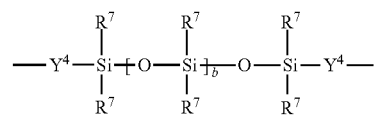

with each R$^7$ is independently an alkyl, haloalkyl, aralkyl, substituted aralkyl, alkenyl, aryl, or substituted aryl. Each group Y$^4$ is independently an alkylene, aralkylene, or a combination thereof. The variable b is an integer equal to at least 1 such as in the range of 1 to 1500.

The term "oxalyl" refers to a divalent group of formula —(CO)—(CO)— where each (CO) denotes a carbonyl group.

The term "oxalylamino" refers to a divalent group of formula —(CO)—(CO)—NR$^a$— where each (CO) denotes a carbonyl group and where R$^a$ is hydrogen, alkyl, aryl, aralkyl, or part of a heterocyclic group that includes the nitrogen atom to which R$^a$ is attached.

The term "aminooxalylamino" refers to a divalent group of formula —NR$^a$—(CO)—(CO)—NR$^a$— where each (CO)

denotes a carbonyl group and each $R^a$ is hydrogen, alkyl, aryl, aralkyl, or part of a heterocyclic group that includes the nitrogen atom to which $R^a$ is attached.

The term "carbonylamino" refers to a divalent group of formula —(CO)—$NR^a$— where each (CO) denotes a carbonyl group and where $R^a$ is hydrogen, alkyl, aryl, aralkyl, or part of a heterocyclic group that includes the nitrogen atom to which $R^a$ is attached.

The term "primary amino" refers to a monovalent group —$NH_2$.

The term "secondary amino" refers to a monovalent group —$NHR^3$ where $R^3$ is an alkyl, aryl, aralkyl, or part of a heterocyclic group that includes the nitrogen atom to which $R^3$ is attached.

The terms "polymer" and "polymeric material" are used interchangeably and refer to materials prepared from one or more reactants (i.e., monomers). Likewise, the term "polymerize" refers to the process of making a polymeric material from one or more reactants. The terms "copolymer" and "copolymeric material" are used interchangeably and refer to polymeric material prepared from at least two different reactants.

Various copolymers are provided that include at least one perfluoropolyether segment, at least one polydiorganosiloxane segment, and at least two aminooxalylamino groups. These copolymers can be a product of a first reaction mixture that includes a fluorinated oxalylamino-containing compound having a perfluoropolyether segment and silicone-based amine having a polydiorganosiloxane segment. This method of preparation is exemplified by Reaction Scheme B below. The copolymers also can be a product of a second reaction mixture that includes a silicone-based oxalylamino-containing compound having a polydiorganosiloxane segment and a fluorinated amine having a perfluoropolyether segment. This method of preparation is exemplified by Reaction Scheme D below. Yet another method for preparing the copolymers is exemplified by Reaction Scheme E below. In this reaction scheme, the copolymers are the product of a third reaction mixture that includes an oxalate compound, a silicone-based amine having a polydiorganosiloxane segment, and a fluorinated amine having a perfluoropolyether segment. The copolymers prepared from the third reaction mixture tend to be more random than copolymers prepared from either the first reaction mixture or the second reaction mixture.

The fluorinated oxalylamino-containing compound in the first reaction mixture or the silicone-based oxalylamino-containing compound in the second reaction mixture each have at least two monovalent oxalylamino groups of Formula (I).

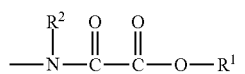
(I)

In Formula (I), each $R^1$ is independently an alkyl, haloalkyl, aralkyl, substituted aralkyl, alkenyl, aryl, substituted aryl, or imino of formula —$N=CR^4R^5$. Each $R^2$ is independently hydrogen, alkyl, aralkyl, or aryl. Group $R^4$ group is hydrogen, alkyl, aralkyl, substituted aralkyl, aryl, or substituted aryl. Group $R^5$ is alkyl, aralkyl, substituted aralkyl, aryl, or substituted aryl.

Suitable alkyl and haloalkyl groups for $R^1$ often have 1 to 10, 1 to 6, or 1 to 4 carbon atoms. Although tertiary alkyl (e.g., tert-butyl) and tertiary haloalkyl groups can be used, a primary or secondary carbon atom is often attached directly (i.e., bonded) to the adjacent oxy group. Exemplary alkyl groups include methyl, ethyl, n-propyl, iso-propyl, n-butyl, and iso-butyl. Exemplary haloalkyl groups include chloroalkyl groups and fluoroalkyl groups in which some, but not all, of the hydrogen atoms on the corresponding alkyl group are replaced with halo atoms. For example, the chloroalkyl or fluoroalkyl groups can be 2-chloroethyl, 2,2,2-trichloroethyl, 3-chloropropyl, 4-chlorobutyl, fluoromethyl, 2-fluoroethyl, 2,2-difluoroethyl, 2,2,2-trifluoroethyl, 1-(trifluoromethyl)-2, 2,2-trifluorethyl, 3-fluoropropyl, 4-fluorobutyl, and the like.

Suitable alkenyl groups for $R^1$ often have 2 to 10, 2 to 8, 2 to 6, or 2 to 4 carbon atoms. Exemplary alkenyl groups include ethenyl, propenyl, butenyl, and pentenyl.

Suitable aryl groups for $R^1$ include those having 6 to 12 carbon atoms such as, for example, phenyl. The aryl can be unsubstituted or substituted with an alkyl (e.g., an alkyl having 1 to 4 carbon atoms such as methyl, ethyl, or n-propyl), an alkoxy (e.g., an alkoxy having 1 to 4 carbon atoms such as methoxy, ethoxy, or propoxy), halo (e.g., chloro, bromo, or fluoro), a haloalkyl (e.g., a haloalkyl having 1 to 4 carbon atoms such as trifluoromethyl), or alkoxycarbonyl (e.g., an alkoxycarbonyl having 2 to 5 carbon atoms such as methoxycarbonyl, ethoxycarbonyl, or propoxycarbonyl).

Suitable aralkyl groups for $R^1$ include those having an alkyl group with 1 to 10 carbon atoms and an aryl group with 6 to 12 carbon atoms. For example, the aralkyl can be an alkyl having 1 to 10 carbon atoms, 1 to 6 carbon atoms, or 1 to 4 carbon atoms substituted with phenyl. The aryl portion of the aralkyl can be unsubstituted or substituted with an alkyl (e.g., an alkyl having 1 to 4 carbon atoms such as methyl, ethyl, or n-propyl), an alkoxy (e.g., an alkoxy having 1 to 4 carbon atoms such as methoxy, ethoxy, or propoxy), halo (e.g., chloro, bromo, or fluoro), a haloalkyl (e.g., a haloalkyl having 1 to 4 carbon atoms such as trifluoromethyl), or alkoxycarbonyl (e.g., an alkoxycarbonyl having 2 to 5 carbon atoms such as methoxycarbonyl, ethoxycarbonyl, or propoxycarbonyl).

Suitable imino groups for $R^1$ are monovalent groups of formula —$N=CR^4R^5$. Suitable alkyl groups for either $R^4$ or $R^5$ can be linear or branched and typically contain 1 to 10 carbon atoms, 1 to 8 carbon atoms, 1 to 6 carbon atoms, or 1 to 4 carbon atoms. Suitable aryl, substituted aryl, aralkyl, and substituted aralkyl groups for $R^4$ or $R^5$ are the same as those describe above for $R^1$.

Each $R^2$ group in Formula (I) can be independently hydrogen, alkyl, aralkyl, or aryl. Suitable alkyl groups can be linear or branched and typically contain 1 to 10 carbon atoms, 1 to 8 carbon atoms, 1 to 6 carbon atoms, or 1 to 4 carbon atoms. Suitable aryl groups typically include those having 6 to 12 carbon atoms. The aryl group is often phenyl. Suitable aralkyl groups include those having an alkyl group with 1 to 10 carbon atoms substituted with an aryl group having 6 to 12 carbon atoms. Exemplary aralkyl groups often include an alkyl having 1 to 10 carbon atoms, 1 to 6 carbon atoms, or 1 to 4 carbon atoms substituted with a phenyl.

In the first reaction mixture used to form the copolymeric material, the compound having at least two terminal groups of Formula (I) is a fluorinated oxalylamino-containing compound having a perfluoropolyether segment. In some embodiments, the fluorinated oxalylamino-containing compound is of Formula (II).

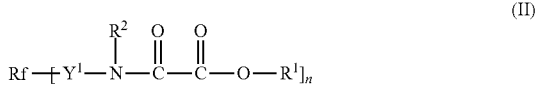 (II)

In Formula (II), Rf is a perfluoropolyether group. Each $Y^1$ is independently (a) a heteroalkylene, (b) alkylene, or (c) a carbonylamino group linking a first group to a second group, wherein each first group and second group is independently a heteroalkylene or alkylene, or (d) a combination thereof. The variable n is an integer greater than or equal to at least 2. For example, n can be at least 3 or at least 4. In The variable n is often no greater than 10, no greater than 8, no greater than 6, no greater than 4, or no greater than 3. The variable n can be in the range of 2 to 10, 2 to 6, or 2 to 4. Groups $R^1$ and $R^2$ are the same as described for Formula (I). The valency of the Rf group is equal to n. To prepare a linear reaction product, n is usually equal to 2 and Rf is a divalent group.

The group Rf in Formula (II) is a perfluoropolyether group. This group typically includes a segment of formula —$(C_xF_{2x}$—$O)_y$— where x is an integer in the range of 1 to 10 and y is an integer equal to at least 2. The integer x is often in the range of 1 to 8, in the range of 1 to 6, in the range of 1 to 4, in the range of 2 to 4, equal to 3, or equal to 4. The integer y is often at least 3, at least 4, at least 8, at least 12, at least 16, at least 20, at least 30, at least 40, or at least 50. In some specific perfluoropolyether groups, x is equal to 3 and the perfluoropolyether group includes a poly(hexafluoropropylene oxide) segment. That is, Rf often includes a segment of formula —$(C_3F_6O)_y$— and each —$C_3F_6O$— group in the segment can be linear or branched. The valency of the Rf group is equal to the variable n. In many embodiments, Rf is a divalent group.

Some exemplary Rf groups are of formula

—$R^6$—$O[CF(CF_3)CF_2O]_w CF(CF_3)$— where $R^6$ is a perfluoroalkylene group having 1 to 20 carbon atoms, 1 to 10 carbon atoms, 1 to 8 carbon atoms, 1 to 6 carbon atoms, 1 to 5 carbon atoms, or 1 to 4 carbon atoms. The variable w is an integer in the range of 1 to 35, in the range of 1 to 30, in the range of 1 to 20, in the range of 1 to 10, or in the range of 1 to 5.

Other exemplary Rf groups are of formula

—$CF(CF_3)[OCF_2CF(CF_3)]_b OCF_2$—$R^6$—$CF_2O[CF(CF_3)CF_2O]_d CF(CF_3)$— where $R^6$ is a perfluoroalkylene group having 1 to 20 carbon atoms, 1 to 10 carbon atoms, 1 to 8 carbon atoms, 1 to 6 carbon atoms, 1 to 5 carbon atoms, or 1 to 4 carbon atoms. The variables b and d are both integers with a sum in the range of 0 to 35, in the range of 1 to 35, in the range of 2 to 35, in the range of 0 to 30, in the range of 1 to 30, in the range of 2 to 30, in the range of 0 to 20, in the range of 1 to 20, in the range of 2 to 20, in the range of 0 to 10, in the range of 1 to 20, in the range of 2 to 15, in the range of 4 to 15, or in the range of 2 to 10. In some exemplary Rf groups, $R^6$ is equal to —$CF_2CF_2$— and the sum of b and d is in the range of 2 to 20, in the range of 4 to 20, or in the range of 4 to 15. The preparation of the corresponding dimethyl esters of these Rf groups is described, for example, in U.S. Pat. No. 3,250,807 (Fritz et al.) such as Example IV of that patent.

Yet other exemplary Rf groups are of formula

—$CF_2O$—$[CF_2]_f$—$[CF_2CF_2O]_g$—$[CF(CF_3)CF_2O]_h$—$CF_2$— where the variables f, g, and h are integers with a sum in the range of 0 to 35, in the range of 1 to 35, in the range of 2 to 35, in the range of 3 to 35, in the range of 3 to 30, in the range of 3 to 20, in the range of 3 to 15, or in the range of 3 to 10. Exemplary materials are commercially available from Solvay Solexis (West Deptford, N.J.) under the trade designation FOMBLIN Z-DEAL.

Still other exemplary Rf groups are of one of the following formulas

—$CF_2O$—$(CF_2CF_2O)_k$—$CF_2$—,

—$CF_2CF_2O$—$(CF_2CF_2CF_2O)_k$—$CF_2CF_2$—, or

—$CF_2CF_2CF_2O$—$(CF_2CF_2CF_2CF_2O)_k$—$CF_2CF_2CF_2$—, where k is a variable in the range of 0 to 35, in the range of 1 to 30, in the range of 1 to 30, in the range of 1 to 20, in the range of 1 to 15, or in the range of 1 to 10. The corresponding dimethyl esters of these Rf groups can be prepared by direct fluorination of an organic precursor that is then reacted with methanol. This preparation method is described in U.S. Pat. No. 5,488,142 (Fall et al.) such as Example 2 of that patent and in U.S. Pat. No. 5,093,432 (Bierschenk et al.) such as in Example 4 of that patent.

Each $Y^1$ in Formula (II) is independently (a) a heteroalkylene, (b) an alkylene, (c) a carbonylamino linking a first group to a second group, wherein the first group and second group are each independently an alkylene or heteroalkylene, or (d) a combination thereof. When group $Y^1$ includes a carbonylamino group linking a first group to a second group, the resulting linked group can be of formula —$Y^{1a}$—(CO)—$NR^2$—$Y^{1a}$— where each $Y^{1a}$ is independently an alkylene or heteroalkylene. Multiple such groups can be linked together such as, for example, —$Y^{1a}$—(CO)$NR^2$—$Y^{1a}$—(CO)$NR^2$—$Y^{1a}$— and —$Y^{1a}$—(CO)$NR^2$—$Y^{1a}$—(CO)$NR^2$—$Y^{1a}$—(CO)$NR^2$—$Y^{1a}$—.

Although any suitable heteroalkylene group can be used for $Y^1$ (or $Y^{1a}$), the heteroalkylene often contains oxygen heteroatoms (i.e., oxy groups). The heteroalkylene often has at least 2 carbon atoms and at least one heteroatom, at least 4 carbon atoms and at least one heteroatom, at least 6 carbon atoms and at least one heteroatoms, at least 10 carbon atoms and at least 2 carbon atoms, or at least 20 carbon atoms and at least 3 or at least 4 heteroatoms. Any suitable alkylene group can be used for $Y^1$ (or $Y^{1a}$). The alkylene group can have at least 1 carbon atoms, at least 2 carbon atoms, at least 3 carbon atoms, at least 4 carbon atoms, at least 6 carbon atoms, at least 10 carbon atoms, or at least 20 carbon atoms.

In other embodiments of the first reaction mixture, the fluorinated oxalylamino-containing compound is of Formula (III).

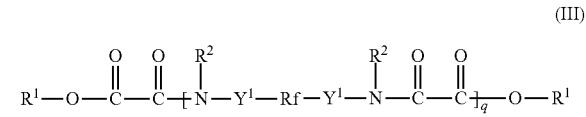 (III)

In Formula (III), each Rf, $Y^1$, $R^2$, and $R^2$ are the same as described above for Formula (II). The variable q is an integer equal to at least 1 and is often equal to at least 2, at least 3, or at least 5. The variable q is often no greater than 100, no greater than 50, no greater than 20, no greater than 15, or no greater than 10. The variable q is often in the range of 1 to 20, in the range of 2 to 20, in the range of 1 to 15, in the range of 1 to 10, in the range of 1 to 6, in the range of 1 to 4, or in the range of 1 to 3. The value of q is affected by the equivalent ratio of the components reacted to form the compound of Formula (III).

When the fluorinated oxalylamino-containing compound is of Formula (III), there can be a mixture of materials having different values for the variable q. For example, at least 50 weight percent of the reaction product can has the variable q equal to 1 with the remainder of the reaction product having the variable q in the range of 2 to 20, in the range of 2 to 10, or in the range of 2 to 5. In some examples, at least 60 weight percent, at least 70 weight percent, at least 80 weight percent, at least 90 weight percent, or at least 95 weight percent of the reaction product has the variable q equal to 1 with the remainder of the reaction product having the variable q in the range of 2 to 20, in the range of 2 to 10, or in the range of 2 to 5.

In some fluorinated oxalylamino-containing compounds of Formula (II) or (III), each group $Y^1$ is equal to —$Y^2$—(CO)—$NR^2$—$Y^3$— and the compounds are of Formula (IIa) and (IIIa), respectively.

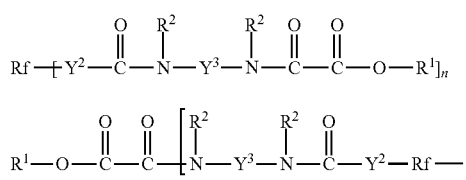

In these formulas, each $Y^2$ is independently a single bond, heteroalkylene, alkylene, or combination thereof. Each $Y^3$ is independently a heteroalkylene, alkylene, or combination thereof.

Although any suitable heteroalkylene can be used for either $Y^2$ or $Y^3$, the heteroalkylene often has oxygen heteroatoms. Each heteroalkylene includes at least 2 carbon atoms and at least one heteroatom, at least 4 carbon atoms and at least one heteroatom, at least 6 carbon atoms and at least 1 heteroatoms, at least 10 carbon atoms and at least 2 carbon atoms, or at least 20 carbon atoms and at least 3 or at least 4 heteroatoms.

Suitable alkylene groups for $Y^2$ have at least one carbon atom while suitable alkylene groups for $Y^3$ have at least two carbon atoms. Exemplary alkylene groups for either $Y^2$ or $Y^3$ can have at least 2 carbon atoms, at least 4 carbon atoms, at least 6 carbon atoms, at least 10 carbon atoms, or at least 20 carbon atoms.

Some more particular fluorinated oxalylamino-containing compounds of Formula (II), (IIa), (III), or (IIIa) include a Rf group of formula

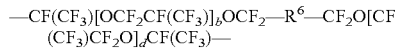

where $R^6$ is a perfluoroalkylene group having 1 to 20 carbon atoms, 1 to 10 carbon atoms, 1 to 8 carbon atoms, 1 to 6 carbon atoms, 1 to 5 carbon atoms, or 1 to 4 carbon atoms. The variables b and d are both integers with a sum in the range of 0 to 35, in the range of 1 to 35, in the range of 2 to 35, in the range of 0 to 30, in the range of 1 to 30, in the range of 2 to 30, in the range of 0 to 20, in the range of 1 to 20, in the range of 2 to 15, in the range of 4 to 15, in the range of 2 to 20, in the range of 0 to 10, in the range of 1 to 20, or in the range of 2 to 10. In some exemplary Rf groups, $R^6$ is equal to —$CF_2CF_2$— and the sum of b and d is in the range of 2 to 20, in the range of 4 to 20, or in the range of 4 to 15.

The fluorinated oxalylamino-containing compounds of Formula (II), (IIa), (III), and (IIIa) can be prepared by the reaction of a fluorinated amine with an oxalate compound. The fluorinated amine has at least one perfluoropolyether segment and at least two primary amino groups, at least two secondary amino groups, or at least one primary amino group plus at least one secondary amino group. The fluorinated amine is often of Formula (IV) or (V).

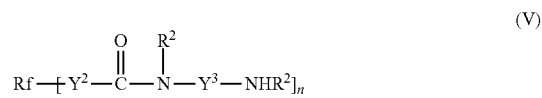

The compounds of Formula (V) are equal to those of Formula (IV) where $Y^1$ in Formula (IV) is equal to —$Y^2$—(CO)—$NR^2$—$Y^3$—. The groups Rf, $Y^1$, $Y^2$, $Y^3$, and $R^2$ are the same as previously described for Formulas (II), (IIa), (III), and (IIIa). The variable n is the same as previously described but is often equal to 2 as shown in Formulas (IVa) and (Va).

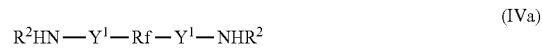

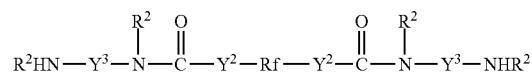

The various fluorinated amines can be prepared using any known method. For example, the fluorinated amines can be prepared by forming a compound of formula A-Rf-A. In this formula, group A refers to a carbonyl-containing group such as an alkoxycarbonyl or halocarbonyl. The preparation of such compounds is further described and exemplified in U.S. Pat. No. 3,250,807 (Fritz et al.) where an initiating fluorinated diacid such as perfluorosuccinyl fluoride is reacted with hexafluoropropylene oxide in bis(2-methoxyethyl) ether (i.e., diglyme) with a catalytic amount of potassium fluoride. This compound A-Rf-A can then be reacted with a diamine of formula $R^2HN$—$Y^3$—$NHR^2$ to prepare the fluorinated amines of Formula (Va) with $Y^2$ being a single bond.

Some exemplary fluorinated amines of Formula (IVa) include, but are not limited to, those of formula Rf—$(CH_2OC_3H_6NH_2)_2$ or Rf—$(CH_2OC_2H_4NH_2)_2$ where $Y^1$ is a heteroalkylene. Other exemplary fluorinated amines include, but are not limited to, those of formula Rf—$(CH_2CH_2NH_2)_2$ or Rf—$(CH_2NH_2)_2$ where $Y^1$ is an alkylene.

To prepare a compound of formula Rf—$(CH_2OC_3H_6NH_2)_2$, a compound of formula Rf—$(COF)_2$ can be reduced to Rf—$(CH_2OH)_2$. Acrylonitrile can then be added to the compound of formula Rf—$(CH_2OH)_2$ to give a compound of formula $Rf—(CH_2OC_2H_4CN)_2$. $Rf—(CH_2OC_2H_4CN)_2$ can then be reduced with hydrogen in the presence of ammonia and a platinum catalyst to form a compound of formula $Rf—(CH_2OC_3H_6NH_2)_2$.

To prepare a compound of formula $Rf—(CH_2OC_2H_4NH_2)_2$, a compound of formula $Rf—(COF)_2$ can be reduced to $Rf—(CH_2OH)_2$. The compound $Rf—(CH_2OH)_2$ can then be reacted with ethylene carbonate to form a compound of formula $Rf—(CH_2OC_2H_4OH)_2$. This compound can then be reacted with methanesulfonyl chloride to form a compound of formula $Rf—(CH_2OC_2H_4OSO_2CH_3)_2$. The compound $Rf—(CH_2OC_2H_4OSO_2CH_3)_2$ can be reacted with liquid ammonia to form $Rf—(CH_2OC_2H_4NH_2)_2$.

To prepare a compound of formula $Rf—(C_2H_4NH_2)_2$, a compound of formula $Rf—(COF)_2$ can be reacted with lithium iodide to form $Rf—(I)_2$. The compound $Rf—(I)_2$ can then be reacted with ethylene to form $Rf—(C_2H_4I)_2$. This product can be further reacted with liquid ammonia to form $Rf—(C_2H_4NH_2)_2$.

To prepare a compound of formula $Rf—(CH_2NH_2)_2$, a compound of formula $Rf—(COF)_2$ can be reacted with ammonia to form $Rf—(CONH_2)_2$ and then reduced with $BH_3$ to $Rf—(CH_2NH_2)_2$. An alternative synthesis method is described in Example XIV of U.S. Pat. No. 3,810,874 (Mitsch et al.).

The oxalate that is reacted with the fluorinated amine (e.g., a compound of Formula (IV), (IVa), (V), or (Va)) to form the fluorinated oxalylamino-containing compound is often a compound of Formula (VI).

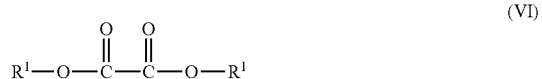
(VI)

Group $R^1$ in Formula (VI) is the same as described for Formula (I). The oxalate compound of Formula (VI) can be prepared, for example, by reacting a compound of formula $R^1—OH$ with oxalyl dichloride. Some oxalates of Formula (I) are commercially available (e.g., from Sigma-Aldrich, Milwaukee, Wis. and from VWR International, Bristol, Conn.) and include, but are not limited to, dimethyl oxalate, diethyl oxalate, di-n-butyl oxalate, di-tent-butyl oxalate, bis (phenyl) oxalate, bis(pentafluorophenyl) oxalate, 1-(2,6-difluorophenyl)-2-(2,3,4,5,6-pentachlorophenyl) oxalate, and bis (2,4,6-trichlorophenyl) oxalate.

An exemplary condensation reaction that can be used to prepare the fluorinated oxalylamino-containing compound is shown in Reaction Scheme A. More particularly, this reaction scheme shows the exemplary condensation reaction of the fluorinated amine of Formula (IVa) with an excess of the oxalate compound of Formula (VI).

Reaction Scheme A

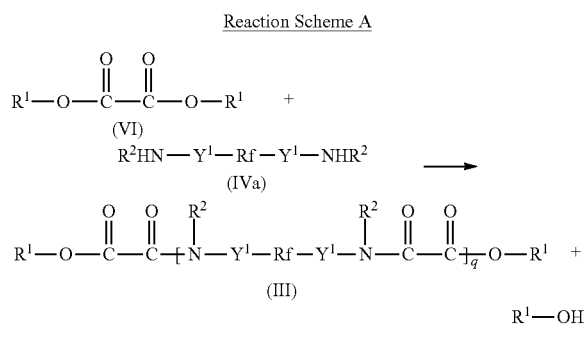

The condensation reaction between the oxalate compound of Formula (VI) and the fluorinated amine to produce a fluorinated oxalylamino-containing compound of Formula (III) can occur in the presence or in the absence of a solvent. In some synthesis methods, no solvent or only a small amount of solvent is included in the reaction mixture. The absence of a solvent can be desirable when the removal of the solvent would be advantageous for the subsequent use of the product of the condensation reaction. In other synthesis methods, a solvent may be included such as, for example, toluene, tetrahydrofuran, dichloromethane, ethyl acetate, trifluoroethanol, trifluorotoluene, tert-butyl methyl ether, hexafluoroisopropanol, or aliphatic hydrocarbons (e.g., alkanes such as hexane).

An excess (e.g., an excess based on equivalents) of the oxalate compound of Formula (VI) is typically used to form the fluorinated oxalylamino-containing compound. The excess oxalate compound can typically be removed from the desired reaction product of the condensation reaction (i.e., compounds of Formulas (II), (IIa), (III), or (IIIa)). If the fluorinated oxalylamino-containing compound is a solid, a filtration method can be used. If the fluorinated oxalylamino-containing compound is a solid or liquid, a stripping process can be used. For example, the reacted mixture (i.e., the product or products of the condensation reaction) can be heated to a temperature up to 150° C., up to 175° C., up to 200° C., up to 225° C., or up to 250° C. or even higher to volatilize the excess oxalate. A vacuum can be pulled to lower the temperature that is needed for removal of the excess oxalate. The compounds of Formula (II), (IIa), (III), or (IIIa) typically undergo minimal or no apparent degradation at temperatures up to 250° C. Any other known methods for removing the oxalate can be used.

The by-product of the condensation reaction is a compound of formula $R^1—OH$, which can be an alcohol, a phenol, or an oxime. Group $R^1$ is often selected to produce a by-product that can be removed (e.g., vaporized) by heating at temperatures no greater than about 250° C. Such by-products can be removed when the reacted mixture is heated to remove any excess oxalate compound of Formula (VI).

The fluorinated oxalylamino-containing compound (e.g., a compound of Formula (II), (IIa), (III), or (IIIa)) can react with a silicone-based amine having at least two primary amino groups, at least two secondary amino groups, or at least one primary amino group plus at least one secondary amino group. The product contains a polydiorganosiloxane segment, a polyether segment, and at least two aminooxalylamino groups. An exemplary condensation reaction is shown in Reaction Scheme B for the reaction of a fluorinated oxalylamino-containing compound of Formula (III) and a silicone-based amine. The group $Q^1$ is equal to the

$R^2HN-Q^2-NHR^2$ (VII)

where $Q^2$ represents a group containing a polydiorganosiloxane segment and $R^2$ is the same as previously described. Silicone diamines such as those of Formula (VII) are often used to prepare linear copolymers.

Reaction Scheme B

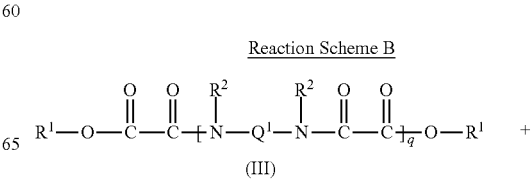

-continued

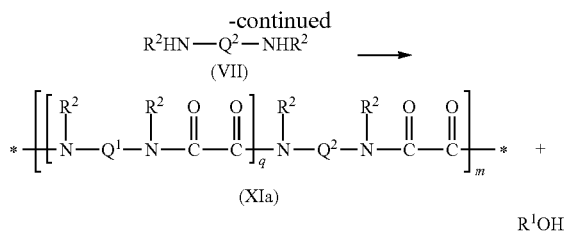

$R^1OH$

In the copolymer product of Formula (XIa), m is an integer equal to at least 1, at least 2, at least 3, at least 5, or at least 10. The variable m can be, for example, up to 1000, up to 500, up to 200, up to 100, up to 50, or up to 20. Each q can be equal to at least 1, at least 2, or at least 5. Variable q can be, for example, up to 100, up to 50, up to 20, or up to 10. In some embodiments, the variable q can be in the range of 1 to 20, in the range of 2 to 20, in the range of 1 to 10, or in the range of 2 to 10. Each asterisk denotes the attachment to any other group in the copolymer. This other group can be, for example, another group of Formula (XIa), an end group, or yet another segment in the copolymeric structure.

The silicone-based amine $R^2HN-Q^2-NHR^2$ of Formula (VII) in Reaction Scheme B is often of Formula (VIII).

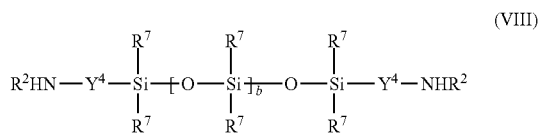

In Formula (VIII), each $Y^4$ is independently an alkylene, aralkylene, or a combination thereof. Each $R^7$ is independently an alkyl, haloalkyl, aralkyl, substituted aralkyl, alkenyl, aryl, or substituted aryl. The variable b is an integer greater than or equal to 1. The variable b is typically an integer greater than 10, greater than 20, greater than 30, or greater than 40. The variable b is often an integer up to 3000, up to 2000, up to 1500, up to 1000, or up to 500. For example, variable b can be in the range of 40 to 1000, 40 to 500, 50 to 500, 50 to 400, 50 to 300, 50 to 200, 50 to 100, 50 to 80, or 50 to 60.

Each $Y^4$ in Formula (VIII) is independently an alkylene, aralkylene, or a combination thereof. Suitable alkylene groups typically have up to 10 carbon atoms, up to 8 carbon atoms, up to 6 carbon atoms, or up to 4 carbon atoms. Exemplary alkylene groups include methylene, ethylene, propylene, butylene, and the like. Suitable aralkylene groups usually have an arylene group having 6 to 12 carbon atoms bonded to an alkylene group having 1 to 10 carbon atoms. In some exemplary aralkylene groups, the arylene portion is phenylene. That is, the divalent aralkylene group is phenylene-alkylene where the phenylene is bonded to an alkylene having 1 to 10, 1 to 8, 1 to 6, or 1 to 4 carbon atoms. As used herein with reference to group $Y^4$, "a combination thereof" refers to a combination of two or more groups selected from an alkylene and aralkylene group. A combination can be, for example, a single aralkylene bonded to a single alkylene (e.g., alkylene-arylene-alkylene). In one exemplary alkylene-arylene-alkylene combination, the arylene is phenylene and each alkylene has 1 to 10, 1 to 6, or 1 to 4 carbon atoms.

Suitable alkyl groups for $R^7$ in Formula (VIII) typically have 1 to 10, 1 to 6, or 1 to 4 carbon atoms. Exemplary alkyl groups include, but are not limited to, methyl, ethyl, isopropyl, n-propyl, n-butyl, and iso-butyl. Suitable haloalkyl groups for $R^7$ often have only a portion of the hydrogen atoms of the corresponding alkyl group replaced with a halogen. Exemplary haloalkyl groups include chloroalkyl and fluoroalkyl groups with 1 to 3 halo atoms and 3 to 10 carbon atoms. Suitable alkenyl groups for $R^7$ often have 2 to 10 carbon atoms. Exemplary alkenyl groups often have 2 to 8, 2 to 6, or 2 to 4 carbon atoms such as ethenyl, 1-propenyl, and 1-butenyl. Suitable aryl groups for $R^7$ often have 6 to 12 carbon atoms. Phenyl is an exemplary aryl group. The aryl can be unsubstituted or substituted with an alkyl (e.g., an alkyl having 1 to 4 carbon atoms such as methyl, ethyl, or n-propyl), an alkoxy (e.g., an alkoxy having 1 to 4 carbon atoms such as methoxy, ethoxy, or propoxy), halo (e.g., chloro, bromo, or fluoro), a haloalkyl (e.g., a haloalkyl having 1 to 4 carbon atoms such as trifluoromethyl), or alkoxycarbonyl (e.g., an alkoxycarbonyl having 2 to 5 carbon atoms such as methoxycarbonyl, ethoxycarbonyl, or propoxycarbonyl). Suitable aralkyl groups for $R^7$ usually have an alkylene group having 1 to 10 carbon atoms and an aryl group having 6 to 12 carbon atoms. In some exemplary aralkyl groups, the aryl group is phenyl and the alkylene group has 1 to 10 carbon atoms, 1 to 6 carbon atoms, or 1 to 4 carbon atoms (i.e., the structure of the aralkyl is alkylene-phenyl where an alkylene is bonded to a phenyl group). The aryl portion of the aralkyl can be unsubstituted or substituted with an alkyl (e.g., an alkyl having 1 to 4 carbon atoms such as methyl, ethyl, or n-propyl), an alkoxy (e.g., an alkoxy having 1 to 4 carbon atoms such as methoxy, ethoxy, or propoxy), halo (e.g., chloro, bromo, or fluoro), a haloalkyl (e.g., a haloalkyl having 1 to 4 carbon atoms such as trifluoromethyl), or alkoxycarbonyl (e.g., an alkoxycarbonyl having 2 to 5 carbon atoms such as methoxycarbonyl, ethoxycarbonyl, or propoxycarbonyl).

In many embodiments of Formula (VIII), at least 50 percent of the $R^7$ groups are methyl. For example, at least 60 percent, at least 70 percent, at least 80 percent, at least 90 percent, at least 95 percent, at least 98 percent, or at least 99 percent of the $R^7$ groups can be methyl. The remaining $R^7$ groups can be an alkyl having at least two carbon atoms, haloalkyl, aralkyl, substituted aralkyl, alkenyl, aryl, or substituted aryl with an alkyl, alkoxy, or halo. In other examples, all of the $R^7$ groups are methyl.

The polydiorganosiloxane diamine of Formula (VIII) can be prepared by any known method and can have any suitable molecular weight, such as a number average molecular weight in the range of 700 to 150,000 grams/mole. Suitable polydiorganosiloxane diamines and methods of making the polydiorganosiloxane diamines are described, for example, in U.S. Pat. No. 3,890,269 (Martin), U.S. Pat. No. 4,661,577 (Jo Lane et al.), U.S. Pat. No. 5,026,890 (Webb et al.), U.S. Pat. No. 5,276,122 (Aoki et al.), U.S. Pat. No. 5,214,119 (Leir et al.), U.S. Pat. No. 5,461,134 (Leir et al.), U.S. Pat. No. 5,512,650 (Leir et al.), and U.S. Pat. No. 6,355,759 (Sherman et al.). A polydiorganosiloxane diamine having a number average molecular weight greater than 2,000 grams/mole or greater than 5,000 grams/mole can be prepared using the methods described in U.S. Pat. No. 5,214,119 (Leir et al.), U.S. Pat. No. 5,461,134 (Leir et al.), and U.S. Pat. No. 5,512,650 (Leir et al.). Some polydiorganosiloxane diamines are commercially available, for example, from Shin Etsu Silicones of America, Inc. (Torrance, Calif.), from Wacker Silicones (Adrian, Mich.), and from Gelest Inc. (Morrisville, Pa.).

In addition to the silicone-based amine, the first reaction mixture can further include other optional second amine compounds having at least two primary amino groups, at least two secondary amino groups, or at least one primary amino group plus at least one secondary amino group. This optional second amine compound is not a silicone-based amine (e.g., the second amine compound does not contain a polydiorganosiloxane segment). The optional second amine compounds can be, for example, fluorinated amines such as those of Formula (IV), (IVa), (V), or (Va) having a perfluoropolyether segment.

Alternatively, the optional second amine can be a diamine of Formula (XV).

$Q^3\text{-}(NHR^8)_n$ (XV)

In Formula (XV), the group $Q^3$ is a group having a valency equal to the variable n. The variable n is the same as defined previously. The group $Q^3$ is (a) a heteroalkane radical, (b) an alkane radical, (c) a fluorinated alkane radical, (d) an arene radical, (e) a carbonylamino group linking a first group to a second group, where each first group and second group is independently a heteroalkane radical, alkane radical, fluorinated alkane radical, arene radical, or a combination thereof, (f) part of a heterocyclic group that includes $R^8$ and a nitrogen to which $R^8$ is attached, or (g) a combination thereof. Each $R^8$ is independently hydrogen, alkyl, aralkyl, aryl, or part of a heterocyclic group that includes $Q^3$ and the nitrogen to which $R^8$ is attached.

In some embodiments, the variable n is an integer equal to at least 3. When the optional amine has more than three primary amino groups and/or secondary amino groups, the optional amine can serve as a crosslinking agent. Examples of optional amines having at least three amino groups include, but are not limited to, tris(2-aminoethyl)amine, diethylene triamine, triethtylene tetramine, tetraethylene pentamine, and hexaethylene heptamine.

In many embodiments, the optional second amine is of Formula (XVI) and there are two primary amino groups, two secondary amino groups, or one primary amino group and one secondary amino group.

$R^8NH\text{-}Q^3\text{-}NHR^8$ (VXI)

In Formula (XVI), the group $Q^3$ is a divalent group and is (a) a heteroalkylene, (b) alkylene, (c) fluorinated alkylene, (d) arylene, (e) a carbonylamino group linking a first group to a second group, where each first group and second group is independently a heteroalkylene, alkylene, fluorinated alkylene, arylene, or a combination thereof, (f) part of a heterocyclic group that includes $R^8$ and a nitrogen to which $R^8$ is attached, or (g) a combination thereof. Each $R^8$ is independently hydrogen, alkyl, aralkyl, aryl, or part of a heterocyclic group that includes $Q^3$ and the nitrogen atom to which $R^8$ is attached. When group $Q^3$ includes a carbonylamino group, the resulting linked group can be of formula -$Q^{3a}$-(CO)$NR^8$-$Q^{3a}$- where each $Q^{3a}$ is independently an alkylene, fluorinated alkylene, heteroalkylene, arylene, or combination thereof. Multiple such groups can be linked such as, for example, -$Q^{3a}$-(CO)$NR^8$-$Q^{3a}$-(CO)$NR^8$-$Q^{3a}$- and -$Q^{3a}$-(CO)$NR^8$-$Q^{3a}$-(CO)$NR^8$-$Q^{3a}$-(CO)$NR^8$-$Q^{3a}$-. Each $R^8$ is independently hydrogen, alkyl, aralkyl, aryl, or part of a heterocyclic group that includes $Q^3$ and the nitrogen atom to which $R^8$ is attached.

A combination in group $Q^3$ or $Q^{3a}$ refers to any combination of heteroalkylene, alkylene, fluorinated alkylene, and arylene groups. Two or more such groups can be connected. For example, the combination can be an alkylene bonded to an arylene group. Such a combination is also referred to as an aralkylene group. Another example is two or more alkylene groups bonded to an arylene group. Some exemplary groups are alkylene-aralkylene groups (i.e., alkylene-arylene-alkylene groups) of formula —$C_xH_{2x}$—$C_6H_4$—$C_xH_{2x}$— where x is in the range of 1 to 10.

Although any suitable heteroalkylene can be used for either $Q^3$ or $Q^{3a}$, the heteroalkylene often has oxygen heteroatoms. Each heteroalkylene includes at least 2 carbon atoms and at least one heteroatom, at least 4 carbon atoms and at least one heteroatom, at least 6 carbon atoms and at least 1 heteroatom, at least 10 carbon atoms and at least 2 heteroatoms, or at least 20 carbon atoms and at least 3 or at least 4 heteroatoms.

Any suitable alkylene group or fluorinated alkylene group can be used for either $Q^3$ or $Q^{3a}$. For example, the alkylene group can have at least 2 carbon atoms, at least 4 carbon atoms, at least 6 carbon atoms, at least 10 carbon atoms, or at least 20 carbon atoms. The alkylene or fluorinated alkylene groups can have, for example, 1 to 20 carbon atoms, 2 to 20 carbon atoms, 1 to 10 carbon atoms, 2 to 10 carbon atoms, 2 to 8 carbon atoms, or 2 to 6 carbon atoms. The fluorinated alkylene groups can be fully fluorinated (i.e., perfluoroalkylene groups with all of the hydrogen atoms on the alkylene replaced with fluorine atoms) or partially fluorinated (e.g., fluorinated alkylene groups with some but not all of the hydrogen atoms replaced with fluorine atoms).

Any suitable arylene can be used for $Q^3$ or $Q^{3a}$. Exemplary arylene groups often have 6 to 12 carbon atoms and include, but are not limited to, phenylene and biphenylene. The arylene group can be unsubstituted or substituted with one or more groups selected from halo, alkyl, haloalkyl, alkoxy, or alkoxycarbonyl.

Each $R^8$ group in Formula (XVI) is independently hydrogen, alkyl, aralkyl, aryl, or part of a heterocyclic group that includes $Q^3$ and the nitrogen atom to which $R^8$ is attached. Suitable alkyl groups can be linear or branched and typically contain 1 to 10 carbon atoms, 1 to 8 carbon atoms, 1 to 6 carbon atoms, or 1 to 4 carbon atoms. Suitable aryl groups typically include those having 6 to 12 carbon atoms. The aryl group is often phenyl. Suitable aralkyl groups include those having an alkyl group with 1 to 10 carbon atoms substituted with an aryl group having 6 to 12 carbon atoms. Exemplary aralkyl groups often include an alkyl having 1 to 10 carbon atoms, 1 to 6 carbon atoms, or 1 to 4 carbon atoms substituted with a phenyl. Some $R^8$ groups combine with $Q^3$ and the nitrogen atom to which $R^8$ is attached to form a heterocyclic group. The heterocyclic group often has at least 4, at least 5, or at least 6 ring atoms with the nitrogen atom being one of these ring atoms. The heterocyclic group can be unsaturated or partially saturated. One exemplary heterocyclic group is the divalent group derived from piperizine.

Some exemplary optional second amines that can be included in the reaction mixture are polyether amines (i.e., the group $Q^3$ is a heteroalkylene with oxygen heteroatoms). Such diamines are commercially available from Huntsman, The Woodlands, Tex. under the trade designation JEFFAMINE. Specific polyether amines include, but are not limited to, JEFFAMINE D-230 (i.e., polyoxypropylene diamine having a number average molecular weight of about 230 grams/mole), JEFFAMINE D-400 (i.e., polyoxypropylene diamine having a number average molecular weight of about 400 grams/mole), JEFFAMINE D-2000 (i.e., polyoxypropylene diamine having a weight average molecular weight of about 2,000 grams/mole), JEFFAMINE HK-511 (i.e., polyetherdiamine with both oxyethylene and oxypropylene groups and having a weight average molecular weight of about 220 grams/mole), JEFFAMINE ED-2003 (i.e., polyether diamine with a polypropylene oxide segment capped polyethylene glycol and having a number average molecular weight of about 2,000 grams/mole), JEFFAMINE EDR-148 (i.e., triethyleneglycol diamine), and JEFFAMINE XTJ-559 (i.e., polyether diamine copolymer of polytetramethylene ether glycol (PTMEG) and polypropylene oxide having an average molecular weight of about 1,400 grams/mole).

Exemplary alkylene diamines (i.e., $Q^3$ is an alkylene) include, but are not limited to, ethylene diamine, propylene diamine, butylene diamine, hexamethylene diamine, 2-methylpentamethylene 1,5-diamine (i.e., commercially available from DuPont, Wilmington, Del. under the trade designation DYTEK A), 1,3-pentane diamine (commercially available from DuPont under the trade designation DYTEK EP), 1,4-cyclohexane diamine, 1,2-cyclohexane diamine (commercially available from DuPont under the trade designation DHC-99), 4,4'-bis(aminocyclohexyl)methane, and 3-aminomethyl-3,5,5-trimethylcyclohexylamine (also called isophorone diamine).

Exemplary arylene diamines (i.e., $Q^3$ is an arylene such as phenylene) include, but are not limited to, m-phenylene diamine, o-phenylene diamine, and p-phenylene diamine. Exemplary aralkylene diamines (i.e., $Q^3$ is an aralkylene such as alkylene-phenyl) include, but are not limited to 4-aminomethyl-phenylamine, 3-aminomethyl-phenylamine, and 2-aminomethyl-phenylamine. Exemplary alkylene-aralkylene diamines (i.e., $Q^3$ is a alkylene-arylene-alkylene group) include, but are not limited to, 4-aminomethyl-benzylamine (i.e, para-xylene diamine), 3-aminomethyl-benzylamine (i.e., meta-xylene diamine), and 2-aminomethyl-benzylamine (i.e., ortho-xylene diamine).

Other diamines have one or more secondary amino groups that are part of a heterocyclic group. Examples include, but are not limited to, piperizine.

In the first reaction mixture, the ratio of the equivalents of the fluorinated oxalylamino-containing compound to the equivalents of the silicone-based amine plus any other optional amine compound is often about 1:1. For example the equivalents ratio is often less than or equal to 1:0.90, less than or equal to 1:0.92, less than or equal to 1:0.95, less than or equal to 1:0.98, or less than or equal to 1:1. The equivalents ratio is often greater than or equal to 1:1.02, greater than or equal to 1:1.05, greater than or equal to 1:1.08, or greater than or equal to 1:1.10. For example, the equivalents ratio can be in the range of 1:0.90 to 1:1.10, in the range of 1:0.92 to 1:1.08, in the range of 1:0.95 to 1:1.05, or in the range of 1:0.98 to 1:1.02. Varying the equivalents ratio can be used, for example, to alter the overall molecular weight, which can affect the rheology of the resulting copolymers. Additionally, varying the equivalents ratio can be used to provide oxalylamino-containing end groups or amino end groups, depending upon which reactant is present in excess.

The condensation reaction of Reaction Scheme B is often conducted at room temperature or at elevated temperatures such as at temperatures up to about 250° C. For example, the reaction often can be conducted at room temperature or at temperatures up to about 100° C. In other examples, the reaction can be conducted at a temperature of at least 100° C., at least 120° C., or at least 150° C. For example, the reaction temperature is often in the range of 100° C. to 220° C., in the range of 120° C. to 220° C., or in the range of 150° C. to 200° C. The condensation reaction is often complete in 1 hour, in 2 hours, in 4 hours, in 8 hours, in 12 hours, in 24 hours, in 36 hours, in 48 hours, in 60 hours, in 72 hours, or longer.

Reaction Scheme B can occur in the presence or absence of a solvent. Conducting Reaction Scheme B in the absence of a solvent can be desirable because only the volatile by-product $R^1OH$ needs to be removed at the conclusion of the reaction. Additionally, a solvent that is not compatible with both reactants and the product can result in incomplete reaction and a low degree of polymerization. In other applications, however, the copolymer will be used in a solvent-based coating composition. In such applications, it can be desirable to prepare the copolymer in the presence of a suitable solvent.

Suitable solvents usually do not react with any of the reactants or products of the reactions. Additionally, suitable solvents are usually capable of maintaining all the reactants and all of the products in solution throughout the polymerization process. Exemplary solvents include, but are not limited to, toluene, tetrahydrofuran, dichloromethane, ethyl acetate, trifluoroethanol, trifluorotoluene, tent-butyl methyl ether, hexafluoroisopropanol, aliphatic hydrocarbons (e.g., alkanes such as hexane), or mixtures thereof.

Any solvent that is present can be stripped from the resulting copolymeric reaction product. Solvents that can be removed under the same conditions used to remove the $R^1$—OH by-product are often preferred. The stripping process is often conducted at a temperature of at least 100° C., at least 125° C., or at least 150° C. The stripping process is typically at a temperature less than 300° C., less than 250° C., or less than 225° C.

Any suitable reactor or process can be used to prepare the copolymeric material according to Reaction Scheme B. The reaction can be conducted using a batch process, semi-batch process, or a continuous process. Exemplary batch processes can be conducted in a reaction vessel equipped with a mechanical stirrer such as a Brabender mixer, provided the product of the reaction is in a molten state has a sufficiently low viscosity to be drained from the reactor. Exemplary semi-batch process can be conducted in a continuously stirred tube, tank, or fluidized bed. Exemplary continuous processes can be conducted in a single screw or twin screw extruder such as a wiped surface counter-rotating or co-rotating twin screw extruder.

In many processes, the components are metered and then mixed together to form a reaction mixture. The components can be metered volumetrically or gravimetrically using, for example, a gear, piston or progressing cavity pump. The components can be mixed using any known static or dynamic method such as, for example, static mixers, or compounding mixers such as single or multiple screw extruders. The reaction mixture can then be formed, poured, pumped, coated, injection molded, sprayed, sputtered, atomized, stranded or sheeted, and partially or completely polymerized. The partially or completely polymerized material can then optionally be converted to a particle, droplet, pellet, sphere, strand, ribbon, rod, tube, film, sheet, coextruded film, web, nonwoven, microreplicated structure, or other continuous or discrete shape, prior to the transformation to solid polymer. Any of these steps can be conducted in the presence or absence of applied heat. In one exemplary process, the components can be metered using a gear pump, mixed using a static mixer, and injected into a mold prior to solidification of the polymerizing material.

In the second reaction mixture used to form the copolymeric material, the compound having at least two terminal groups of Formula (I) is a silicone-based oxalylamino-containing compound having a polydiorganosiloxane segment. This silicone-based compound is reacted with a fluorinated amine having a perfluoropolyether segment and at least two primary amino groups, at least two secondary amino groups, or a combination of at least one primary amino group plus at least one secondary amino group.

The first reaction mixture and the second reaction mixture are complementary reaction mixtures. In the first reaction mixture, the terminal groups of Formula (I) are on a fluorinated compound having a perfluoropolyether segment. This fluorinated oxalylamino-containing compound is reacted with a silicone-based amine having a polydiorganosiloxane segment and multiple primary and/or secondary amino groups (i.e., at least two primary amino groups, at least two secondary amino groups, or at least one primary amino group plus at least at least one secondary amino group). This reaction is exemplified in Reaction Scheme B above. In the second reaction mixture, the terminal groups of Formula (I) are on a silicone-based material having a polydiorganosiloxane segment. This silicone-based oxalylamino-containing compound is reacted with a fluorinated amine having a perfluoropolyether segment and multiple primary and/or secondary amino groups. This reaction is exemplified in Reaction Scheme D below. A similar type of copolymeric material can be prepared using either the first reaction mixture or the second reaction mixture.

The silicone-based oxalylamino-containing compound included in the second reaction mixture is often of Formula (IX).

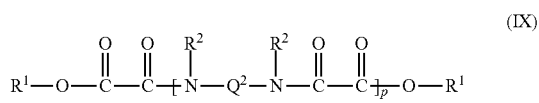

In Formula (IX), groups $R^1$ and $R^2$ are the same as previously defined. Group $Q^2$ includes a polydiorganosiloxane segment. The variable p is an integer equal to at least 1. For example, variable p can be at least 2, at least 3, or at least 5. Variable p can be, for example, up to 100, up to 50, up to 20, or up to 10. In some embodiments, the variable p can be in the range of 1 to 20, in the range of 2 to 20, in the range of 1 to 10, or in the range of 2 to 10.

In some embodiments of Formula (IX), the divalent group $Q^2$ is a group of Formula (X).

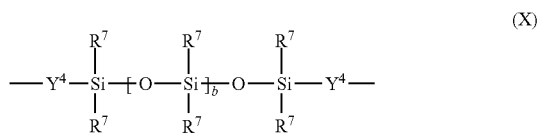

The groups $R^7$ and $Y^4$ as well as the variable b are the same as defined for Formula (VIII).

The compound of Formula (IX) can be prepared by the reaction of an oxalate of Formula (VI) with a silicone-based amine of Formula (VII) or (VIII). This exemplary condensation reaction is shown in Reaction Scheme C.

Reaction Scheme C

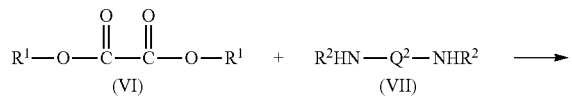

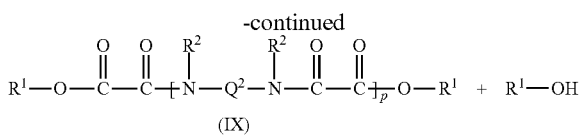

As with Reaction Scheme A, the condensation reaction in Reaction Scheme C can occur in the presence or in the absence of a solvent. In some synthesis methods, no solvent or only a small amount of solvent is included in the reaction mixture. The absence of a solvent can be desirable when the removal of the solvent would be advantageous for the subsequent use of the product of the condensation reaction. In other synthesis methods, a solvent may be included such as, for example, toluene, tetrahydrofuran, dichloromethane, or aliphatic hydrocarbons (e.g., alkanes such as hexane).

An excess (e.g., an excess based on equivalents) of the oxalate compound of Formula (VI) is typically used to form the silicone-based oxalylamino-containing compound of Formula (IX). The excess is often at least 5 times, at least 7 times, or at least 10 times the stoichiometric amount needed for the reaction. The excess can typically be removed from the desired reaction product of the condensation reaction using a stripping process similar to that described for Reaction Scheme A. The by-product of the condensation reaction is a compound of formula $R^1$—OH. This by-product is usually an alcohol, phenol, or oxime. Group $R^1$ is often selected to produce an alcoholic by-product that can be removed (e.g., vaporized) by heating at temperatures no greater than about 250° C. Such a by-product can be removed when the reacted mixture is heated to remove any excess oxalate compound of Formula (VI).

Once formed, the silicone-based oxalylamino-containing compound of Formula (IX) can undergo a condensation reaction with a fluorinated amine having a perfluoropolyether segment. Suitable fluorinated amines are those described previously with at least two primary amino groups, at least two secondary amino groups, or at least one primary amino group plus at least one secondary amino groups. Such fluorinated amines are those, for example, of Formula (IV), (IVa), (V), or (Va). Reaction Scheme D shows an exemplary reaction of a silicone-based oxalylamino-containing compound of Formula (IX) with a fluorinated amine of Formula (IVa) with $Q^1$ equal to the divalent group —$Y^1$—Rf—$Y^1$—. The product is a copolymer having at least one group of Formula (XIb).

Reaction Scheme D

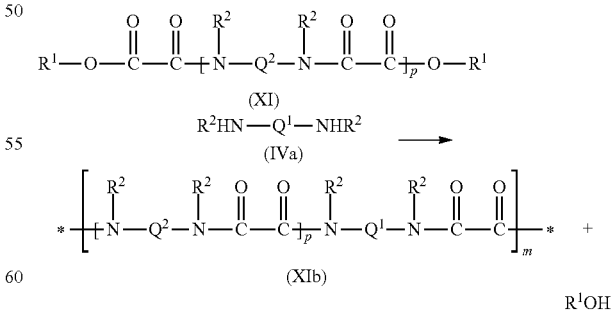

In the copolymeric product of Formula (XIb), m is an integer equal to at least 1, at least 2, at least 3, at least 5, or at least 10. The variable m can be, for example, up to 1000, up to 500, up to 200, up to 100, up to 50, or up to 20. Each p can be equal to at least 1, at least 2, or at least 5. Variable p can be, for example, up to 100, up to 50, up to 20, or up to 10. In some embodiments, the variable p can be in the range of 1 to 20, in the range of 2 to 20, in the range of 1 to 10, or in the range of 2 to 10. Each asterisk denotes the attachment to any other group in the copolymer. This other group can be, for example, another group of Formula (XIb), an end group, or yet another unit in the copolymeric structure.

In addition to the fluorinated amine, the second reaction mixture can further include other optional second amine compounds having at least two primary amino groups, at least two secondary amino groups, or at least one primary amino group plus at least one secondary amino group. This optional second amine compound is not a fluorinated amine having a perfluoropolyether segment. These optional second amine compounds can be, for example, silicone-based amines such as those of Formula (VIII). Alternatively, the optional second amine can be an amine compound of Formula (XV) as described for use with the first reaction mixture. An optional second amine with more than two primary and/or secondary amino groups can be used to provide a crosslinked copolymer.

In many embodiments, the optional second amine of Formula (XVI).

$$R^8NH-Q^3-NR^8 \quad (XVI)$$

In Formula (XVI), the group $Q^3$ is (a) a heteroalkylene, (b) alkylene, (c) fluorinated alkylene, (d) arylene, (e) a carbonylamino group linking a first group to a second group, where each first group and second group is independently a heteroalkylene, alkylene, fluorinated alkylene, arylene, or a combination thereof, (f) part of a heterocyclic group that includes $R^8$ and a nitrogen to which $R^8$ is attached, or (g) a combination thereof. Each $R^8$ is independently hydrogen, alkyl, aralkyl, aryl, or part of a heterocyclic group that includes $Q^3$ and the nitrogen atom to which $R^8$ is attached. Suitable examples of these optional second amines of formula $R^8NH-Q^3-NHR^8$ are the same as those described previously for use in the first reaction mixture.

In the second reaction mixture, the ratio of the equivalents of the silicone-based oxalylamino-containing compound to the equivalents of the amine compounds (fluorinated amine plus any optional amine compounds) if often about 1:1. For example the equivalents ratio is often less than or equal to 1:0.90, less than or equal to 1:0.92, less than or equal to 1:0.95, less than or equal to 1:0.98, or less than or equal to 1:1. The equivalents ratio is often greater than or equal to 1:1.02, greater than or equal to 1:1.05, greater than or equal to 1:1.08, or greater than or equal to 1:1.10. For example, the equivalents ratio can be in the range of 1:0.90 to 1:1.10, in the range of 1:0.92 to 1:1.08, in the range of 1:0.95 to 1:1.05, or in the range of 1:0.98 to 1:1.02. Varying the equivalents ratio can be used, for example, to alter the overall molecular weight, which can affect the rheology of the resulting copolymers. Additionally, varying the equivalents ratio can be used to provide oxalylamino-containing end groups or amino end groups, depending upon which reactant is present in excess (e.g., an excess based on equivalents).

The same process conditions described for Reaction Scheme B can be used for Reaction Scheme D. More specifically, the condensation reaction is often conducted at room temperature or at elevated temperatures such as at temperatures up to about 250° C. The condensation reaction is often complete in 1 hour, in 2 hours, in 4 hours, in 8 hours, in 12 hours, in 24 hours, in 36 hours, in 48 hours, in 60 hours, in 72 hours, or longer. Any suitable reactor or process can be used.

The condensation reaction of Reaction Scheme D can occur in the presence or absence of a solvent. Suitable solvents usually do not react with any of the reactants or products of the reactions. Additionally, suitable solvents are usually capable of maintaining all the reactants and all of the products in solution throughout the polymerization process. Exemplary solvents include, but are not limited to, toluene, tetrahydrofuran, dichloromethane, ethyl acetate, trifluoroethanol, trifluorotoluene, tert-butyl methyl ether, hexafluoroisopropanol, aliphatic hydrocarbons (e.g., alkanes such as hexane), or mixtures thereof. Any solvent that is present can be stripped from the resulting copolymeric material at the completion of the reaction. Solvents that can be removed under the same conditions used to remove the alcohol by-product are often preferred.

Yet another method can be used to prepare the copolymer. A third reaction mixture can be prepared that includes the oxalate compound of Formula (VI), a silicone-based amine having a polydiorganosiloxane segment such as a silicone-based amine of Formula (VII) or (VIII), and a fluorinated amine having a perfluorpolyether segment such as a fluorinated amine of Formula (IV), (IVa), (V), or (Va).

The method of forming the copolymer from the third reaction mixture is exemplified in Reaction Scheme E. The oxalate compound of Formula (VI) is reacted in the presence of multiple amines. The amines include a fluorinated amine having a perfluoropolyether segment of Formula (IVa) and a silicone-based amine having a polydiorganosiloxane segment of Formula (VII). The copolymer is of Formula (XI).

Reaction Scheme E

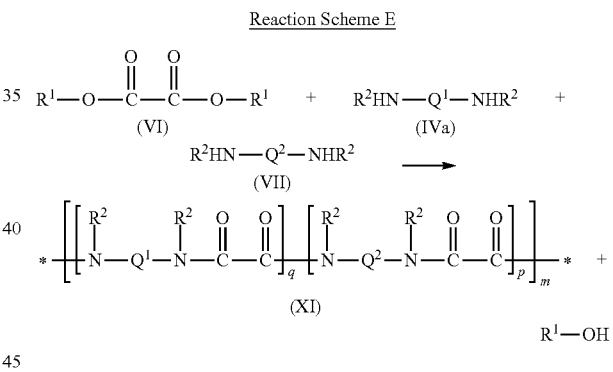

The same conditions used to form the fluorinated oxalylamino-containing compound in Reaction Scheme A or to form the silicone-based oxalylamino-containing compound in Reaction Scheme C can be used. Any method described for removing any excess oxalate compound or the byproducts of formula $R^1$—OH can be used with this method of preparing the copolymer.

Other optional second amine compounds as described above can also be included in the third reaction mixture. In particular, suitable second amine compounds are those of Formulas (XV) and (XVI) described above. The copolymers prepared using this method tend to be more random than the copolymers prepared from either the first reaction mixture or the second reaction mixture.

In the third reaction mixture, the ratio of the equivalents of the oxalate compound to the equivalents of the amine compounds (fluorinated amine plus silicone-base amine plus any optional amine compounds) if often about 1:1. For example the equivalents ratio is often less than or equal to 1:0.90, less than or equal to 1:0.92, less than or equal to 1:0.95, less than or equal to 1:0.98, or less than or equal to 1:1. The equivalents ratio is often greater than or equal to 1:1.02, greater than or equal to 1:1.05, greater than or equal to 1:1.08, or greater than or equal to 1:1.10. For example, the equivalents ratio can be in the range of 1:0.90 to 1:1.10, in the range of 1:0.92 to 1:1.08, in the range of 1:0.95 to 1:1.05, or in the range of 1:0.98 to 1:1.02. Varying the equivalents ratio can be used, for example, to alter the overall molecular weight, which can affect the rheology of the resulting copolymers. Additionally, varying the equivalents ratio can be used to provide oxalylamino-containing end groups or amino end groups, depending upon which reactant is present in excess (e.g., an excess based on equivalents).

In another aspect, a copolymer is provided. The copolymer contains at least one group of Formula (XI).

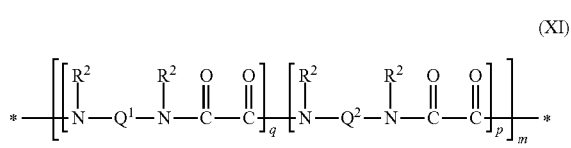

In Formula (XI), each group $Q^1$ contains a perfluoropolyether segment and each group $Q^2$ contains a polydiorganosiloxane segment. The group $R^2$ is the same as described previously for Formula (I). Each variable q, p, and m is independently an integer equal to at least 1. For example, the variable m can be equal to at least 2, at least 3, at least 5, or at least 10. The variable m can be, for example, up to 1000, up to 500, up to 200, up to 100, up to 50, or up to 20. Each variable q and p independently can be equal to at least 1, at least 2, or at least 5. These variable q and p independently can be, for example, up to 100, up to 50, up to 20, or up to 10. In some embodiments, the variables q and p independently can be in the range of 1 to 20, in the range of 2 to 20, in the range of 1 to 10, or in the range of 2 to 10. Group $R^2$ is the same as described for Formula (I). Each asterisk denotes a site of attachment to another group in the copolymer. This other group can be an end group, another group of Formula (XI), or any other group in the copolymer. The copolymer of Formula (XI) is equal to the copolymer of Formula (XIa) when p is equal to 1 and is equal to the copolymer of Formula (XIb) when q is equal to 1.

In many embodiments of Formula (XI), group $Q^2$ is equal to a group of Formula (X).

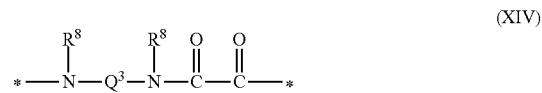

The groups $R^7$ and $Y^4$ as well as the variable b are the same as defined for Formula (VIII).

In many embodiments of Formula (XI), each group $Q^1$ is equal to the divalent group of Formula (XII)

$$—Y^1—Rf—Y^1—$$ (XII)

or to the divalent group of Formula (XIII).

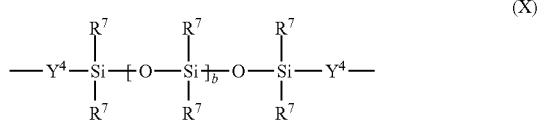

Groups Rf, $Y^1$, $Y^2$, $Y^3$, and $R^2$ are the same as previously described. In some more particular embodiments of either (XII) or (XIII), the group Rf can be of formula —CF(CF$_3$)[OCF$_2$CF(CF$_3$)]$_b$OCF$_2$—R$^6$—CF$_2$O[CF(CF$_3$)CF$_2$O]$_d$CF(CF$_3$)— where $R^6$, b, and d are the same as previously described.

In addition to the group of Formula (XI), the copolymer can further include a segment of Formula (XIV).

Groups $R^8$ and $Q^3$ are the same are previously defined. The asterisk each denotes the site of attachment to another group in the copolymer. This other group can be, for example, an end group, another group or Formula (XI), or another group of Formula (XIV). In some embodiments, there are multiple $Q^3$ groups that are different from each other.

The copolymers of Formula (XI), (XIa), and (XIb) can be cast from solvents as film, molded or embossed in various shapes, or extruded into films. The high temperature stability of the copolymers makes them well suited for extrusion methods of film formation.

Various articles can be prepared that contain the polymer of Formula (XI), (XIa), or (XIb). The article, for example, can include a layer containing the copolymer of Formula (XI), (XIa), or (XIb) and one or more optional substrates. For example, the copolymer of Formula (XI), (XIa), or (XIb) can be in a layer adjacent to a first substrate or positioned between a first substrate and a second substrate. That is, the article can be arranged in the following order: a first substrate, a layer containing the copolymer of Formula (XI) (XIa), or (XIb), and a second substrate. As used herein, the term "adjacent" refers to a first layer that contacts a second layer or that is positioned in proximity to the second layer but separated from the second layer by one or more additional layers.

The copolymeric materials include the aminooxalylamino groups that are capable of hydrogen bonding. The formation of hydrogen bonds tends to increase the strength and rigidity of the copolymers compared to the perfluoropolyether or polydioroganosiloxane materials alone. That is, the aminooxalylamino groups can be used to modify the characteristics of the copolymers. These copolymeric materials can be used, for example, in applications where abrasion resistance is desired. Additionally, these copolymeric materials often can be subjected to temperatures as high as 250° C. with minimal degradation.

The copolymeric materials can be used in applications where materials having low refractive index, low surface energy, oil and/or water repellency, or a combination thereof are desired. The copolymeric materials can be used to form antireflective coatings or films. Films or coatings containing the copolymeric materials are usually easily cleaned. Various items are provided including various products of reaction mixtures and copolymers.

A first item is provided that is a copolymer that includes a product of a reaction mixture. The reaction mixture includes a) a fluorinated oxalylamino-containing compound and b) a silicone-based amine having at least two primary amino groups, two secondary amino groups, or a mixture thereof. The fluorinated oxalylamino-containing compound includes at least one perfluoropolyether segment and at least two monovalent terminal groups of Formula (I).

(I)

In Formula (I), each $R^1$ is independently an alkyl, haloalkyl, aralkyl, substituted aralkyl, alkenyl, aryl, substituted aryl, or imino of formula $—N=CR^4R^5$. Each $R^2$ is independently hydrogen, alkyl, aralkyl, or aryl. Group $R^4$ is hydrogen, alkyl, aralkyl, substituted aralkyl, aryl, or substituted aryl. Group $R^5$ is alkyl, aralkyl, substituted aralkyl, aryl, or substituted aryl.

A second item is provided that can be a version of the first item. In the second item, the fluorinated oxalylamino-containing compound is of Formula (II).

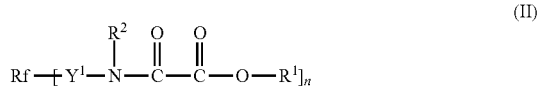
(II)

In Formula (II), Rf is a perfluoropolyether group. Each $Y^1$ is independently (a) a heteroalkylene, (b) alkylene, or (c) a carbonylamino group linking a first group to a second group, wherein the first group and the second group are each independently a heteroalkylene or alkylene, or (d) a combination thereof. The variable n is an integer greater than or equal to at least 2.

A third item is provided that can be a version of the second item. In the second item, the fluorinated oxalylamino-containing compound is of Formula (IIa).

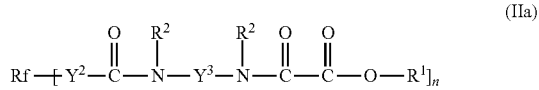
(IIa)

Each $Y^1$ in Formula (II) is equal to $—Y^2—(CO)—NH—Y^3—$ in Formula (IIa). Each $Y^2$ is independently a single bond, heteroalkylene, alkylene, or combination thereof; and each $Y^3$ is independently a heteroalkylene, alkylene, or combination thereof.

A fourth item is provided that can be a version of the first item. In the fourth item, the fluorinated oxalylamino-containing compound is of Formula (III).

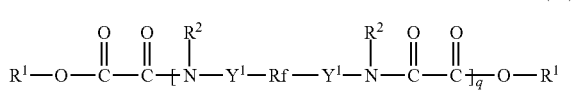
(III)

In Formula (III), Rf is a perfluoropolyether group. Each $Y^1$ is independently (a) a heteroalkylene, (b) alkylene, (c) a carbonylamino group linking a first group to a second group, wherein the first group and the second group are each independently a heteroalkylene or alkylene, or (d) a combination thereof. The variable q is an integer equal to at least 1.

A fifth item is provided that can be a version of the fourth item. In the fifth item, the fluorinated oxalylamino-containing compound of Formula (IIIa).

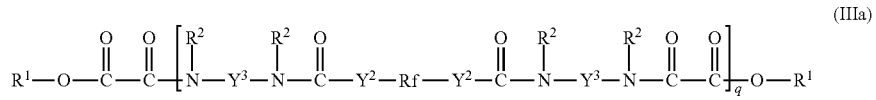
(IIIa)

Each $Y^1$ in Formula (III) is equal to $—Y^2—(CO)—NH—Y^3—$ in Formula (IIIa). Each $Y^2$ is independently a single bond, heteroalkylene, alkylene, or combination thereof; and each $Y^3$ is independently a heteroalkylene, alkylene, or combination thereof.

A sixth item if provided that can be a version of any one of the first to fifth items. In the sixth item, the silicone-based amine is of Formula (VIII).

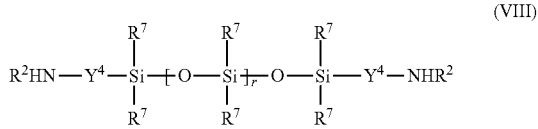
(VIII)

In Formula (VIII), each $Y^4$ is independently an alkylene, aralkylene, or a combination thereof. Each $R^7$ is independently an alkyl, haloalkyl, aralkyl, substituted aralkyl, alkenyl, aryl, or substituted aryl. The variable r is an integer greater than or equal to 1.

A seventh item is provided that can be a version of any one of the first to sixth items. In the seventh item, the reaction mixture further includes a second amine compound of Formula (XVI).

$$R^8HN\text{-}Q^3\text{-}NHR^8 \quad (XVI)$$

In Formula (XVI), the group $Q^3$ is (a) a heteroalkylene, (b) alkylene, (c) fluorinated alkylene, (d) arylene, (e) a carbonylamino group linking a first group to a second group, where each first group and second group is independently a heteroalkylene, alkylene, fluorinated alkylene, arylene, or a combination thereof, (f) part of a heterocyclic group that includes $R^8$ and the nitrogen to which $R^8$ is attached, or (g) a combination thereof. Each $R^8$ is independently hydrogen, alkyl, aralkyl, aryl, or part of a heterocyclic group that includes $Q^3$ and the nitrogen atom to which $R^8$ is attached.

An eighth item is provided that is a copolymer that includes a product of a reaction mixture. The reaction mixture includes a) a silicone-based oxalylamino-containing compound and b) a fluorinated amine having a perfluoropolyether segment and having at least two primary amino groups, two secondary amino groups, or a mixture thereof. The silicone-based oxalylamino-containing compound contains at least one polydiorganosiloxane segment and at least two monovalent terminal groups of Formula (I).

$$\begin{array}{c} R^2 \;\; O \;\; O \\ | \;\;\; \| \;\;\; \| \\ -\!\!-\!\!N\!-\!\!C\!-\!\!C\!-\!\!O\!-\!\!R^1 \end{array} \quad (I)$$

In Formula (I), each $R^1$ is independently an alkyl, haloalkyl, aralkyl, substituted aralkyl, alkenyl, aryl, substituted aryl, or imino of formula $-N=CR^4R^5$. Each $R^2$ is independently hydrogen, alkyl, aralkyl, or aryl. Group $R^4$ is hydrogen, alkyl, aralkyl, substituted aralkyl, aryl, or substituted aryl. Group $R^5$ is alkyl, aralkyl, substituted aralkyl, aryl, or substituted aryl.

A ninth item is provided that can be a version of the eighth item. In the ninth item, the fluorinated amine is of Formula (IV).

$$Rf\text{-}[\text{-}Y^1\text{---}NHR^2]_n \quad (IV)$$

In Formula (IV), Rf is a perfluoropolyether group. Each $Y^1$ is independently (a) a heteroalkylene, (b) alkylene, or (c) a carbonylamino group linking a first group to a second group, wherein the first group and the second group are each a heteroalkylene or alkylene, or (d) a combination thereof. The variable n is an integer equal to at least 1.

A tenth item is provided that can be a version of the ninth item. In the tenth item, the fluorinated amine is of Formula (V).

$$Rf\text{---}[Y^2\text{---}\underset{\|}{\text{C}}\text{---}\underset{|}{\text{N}}\text{---}Y^3\text{---}NHR^2]_n \quad (V)$$

(with O double-bonded to C and $R^2$ on N)

Each $Y^1$ in Formula (IV) is equal to $-Y^2-(CO)-NH-Y^3-$ in Formula (V). Each $Y^2$ is independently a single bond, heteroalkylene, alkylene, or combination thereof; and each $Y^3$ is independently a heteroalkylene, alkylene, or combination thereof.

An eleventh item is provided that can be a version of any one of the eighth to tenth items. In the eleventh item, the silicone-based oxalylamino-containing compound is of Formula (IX).

$$R^1\text{---}O\text{---}\underset{\|}{\text{C}}\text{---}\underset{\|}{\text{C}}\text{---}[\text{N}\underset{|}{R^2}\text{---}Q^2\text{---}\text{N}\underset{|}{R^2}\text{---}\underset{\|}{\text{C}}\text{---}\underset{\|}{\text{C}}]_p\text{---}O\text{---}R^1 \quad (IX)$$

In Formula (IX), group $Q^2$ includes a polydiorganosiloxane segment. The variable p is an integer equal to at least 1.

A twelfth item is provided that can be a version of the eleventh item. In the twelfth item, the group $Q^2$ is a divalent group of Formula (X).

$$-Y^4-\underset{R^7}{\overset{R^7}{Si}}\text{---}[O\text{---}\underset{R^7}{\overset{R^7}{Si}}]_b\text{---}O\text{---}\underset{R^7}{\overset{R^7}{Si}}-Y^4- \quad (X)$$

In Formula (X), each $Y^4$ is independently an alkylene, aralkylene, or a combination thereof. Each $R^7$ is independently an alkyl, haloalkyl, aralkyl, substituted aralkyl, alkenyl, aryl, or substituted aryl. The variable b is an integer greater than or equal to at least 1.

A thirteenth item is provided that can be a version of any one of the eighth to twelfth items. In the thirteenth item, the reaction mixture further includes a second amine compound of Formula (XVI).

$$R^8NH\text{-}Q^3\text{-}NHR^8 \quad (XVI)$$

In Formula (XVI), the group $Q^3$ is (a) a heteroalkylene, (b) alkylene, (c) fluorinated alkylene, (d) arylene, (e) a carbonylamino group linking a first group to a second group, where each first group and second group is independently a heteroalkylene, alkylene, fluorinated alkylene, arylene, or a combination thereof, (f) part of a heterocyclic group that includes $R^8$ and the nitrogen to which $R^8$ is attached, or (g) a combination thereof. Each $R^8$ is independently hydrogen, alkyl, aralkyl, aryl, or part of a heterocyclic group that includes $Q^3$ and the nitrogen atom to which $R^8$ is attached.

A fourteenth item is provided that is a copolymer that includes a product of a reaction mixture. The reaction mixture includes a) an oxalate compound, b) a fluorinated amine having a perfluoropolyether segment and having at least two primary amino groups, two secondary amino groups, or a mixture thereof, and c) a silicone-based amine having a polydiorganosiloxane segment and at least two primary amino groups, at least two secondary amino groups, or at least one primary amino group plus at least one secondary amino group. The oxalate compound is of Formula (VI).

$$R^1\text{---}O\text{---}\underset{\|}{\text{C}}\text{---}\underset{\|}{\text{C}}\text{---}O\text{---}R^1 \quad (VI)$$

In Formula (VI), each $R^1$ is independently an alkyl, haloalkyl, aralkyl, substituted aralkyl, alkenyl, aryl, substituted aryl, or imino of formula $-N=CR^4R^5$. Each $R^2$ is independently hydrogen, alkyl, aralkyl, or aryl. Group $R^4$ is hydrogen, alkyl, aralkyl, substituted aralkyl, aryl, or substituted aryl. Group $R^5$ is alkyl, aralkyl, substituted aralkyl, aryl, or substituted aryl.

A fifteenth item is provided that is a copolymer having at least one group of Formula (XI).

$$*\!-\!\!\left[\!\left[\text{N}\underset{|}{\overset{R^2}{\phantom{|}}}\!\!-\!Q^1\!-\!\text{N}\underset{|}{\overset{R^2}{\phantom{|}}}\!\!-\!\underset{\|}{\text{C}}\!-\!\underset{\|}{\text{C}}\right]_q\!\!\left[\text{N}\underset{|}{\overset{R^2}{\phantom{|}}}\!\!-\!Q^2\!-\!\text{N}\underset{|}{\overset{R^2}{\phantom{|}}}\!\!-\!\underset{\|}{\text{C}}\!-\!\underset{\|}{\text{C}}\right]_p\right]_m\!\!-\!\!* \quad (XI)$$

In Formula (XI), each group $Q^1$ contains a perfluoropolyether segment and each group $Q^2$ contains a polydiorganosiloxane segment. Each $R^2$ is independently hydrogen, alkyl, aralkyl, or aryl. Each variable q, p, and m is independently an integer equal to at least 1. Each asterisk denotes a site of attachment to another group in the copolymer.

A sixteenth item is provided that can be a version of the fifteenth item. In the sixteenth item, the group $Q^2$ is a divalent group of Formula (X).

$$-Y^4-\underset{R^2}{\overset{R^2}{Si}}\text{---}[O\text{---}\underset{R^2}{\overset{R^2}{Si}}]_b\text{---}O\text{---}\underset{R^2}{\overset{R^2}{Si}}-Y^4- \quad (X)$$

In Formula (X), each $Y^4$ is independently an alkylene, aralkylene, or a combination thereof. Each $R^2$ is independently an alkyl, haloalkyl, aralkyl, alkenyl, aryl, or aryl substituted with an alkyl, alkoxy, or halo, wherein at least 50 percent of the R2 groups are methyl. The variable b is an integer greater than or equal to at least 1.

A seventeenth item is provided that can be a version of the fifteenth or sixteenth item. In the seventeenth item, $Q^1$ is a divalent group of Formula (XII).

In Formula (XII), each $Y^1$ is independently (a) a heteroalkylene, (b) alkylene, or (c) a carbonylamino group linking a first group to a second group, wherein the first group and the second group are each a heteroalkylene or alkylene, or (d) a combination thereof. The group Rf is a perfluoropolyether group.

An eighteenth item is provided that can be a version of the sixteenth or seventeenth items. In the eighteenth item, $Q^1$ is the divalent group of Formula (XIII).

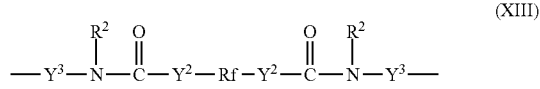

In Formula (XIII), each $Y^2$ is independently a single bond, heteroalkylene, alkylene, or combination thereof; and each $Y^3$ is independently a heteroalkylene, alkylene, or combination thereof.

A nineteenth item is provided that can be a version of any one of fifteenth to eighteenth items. In the nineteenth item, the copolymer further comprises at least one divalent group of Formula (XIV).

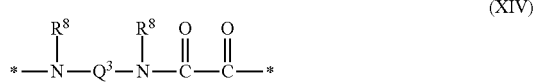

In Formula (XIV), the group $Q^3$ is (a) a heteroalkylene, (b) alkylene, (c) fluorinated alkylene, (d) arylene, (e) a carbonylamino group linking a first group to a second group, where each first group and second group is independently a heteroalkylene, alkylene, fluorinated alkylene, arylene, or a combination thereof, (f) part of a heterocyclic group that includes $R^8$ and the nitrogen to which $R^8$ is attached, or (g) a combination thereof. Each $R^8$ is independently hydrogen, alkyl, aralkyl, aryl, or part of a heterocyclic group that includes $Q^3$ and the nitrogen atom to which $R^8$ is attached.

A twentieth item is provided that can be a version of any one of the fifteenth to nineteenth items. In the twentieth item, at least one of p or q is equal to 1.

A twenty-first item is provided that can be a version of any one of the fifteenth to twentieth items. In the twenty-first item, Rf is of formula —$CF(CF_3)[OCF_2CF(CF_3)]_bOCF_2$—$R^6$—$CF_2O[CF(CF_3)CF_2O]_dCF(CF_3)$—. In this formula, $R^6$ is a perfluoroalkylene group. The variables b and d are integers with a sum in the range of 0 to 35.

A twenty-second item is provided that can be a version of any one of the first to twenty-first items. In the twenty-second item, the copolymer is crosslinked polymeric material.

A twenty-third item is provided that can be a version of any one of the first to twenty-first items. In the twenty-third item, the copolymer is a linear polymeric material.

EXAMPLES

These examples are for illustrative purposes only and are not meant to be limiting on the scope of the appended claims. All parts, percentages, and ratios in the examples are by weight unless otherwise noted. Solvents and other reagents used can be obtained from Sigma-Aldrich Chemical Company (Milwaukee, Wis.) unless otherwise noted.

As used herein, the term "HFPO" refers to monovalent or divalent poly(hexafluoropropylene oxide) segment. In some embodiments the HFPO segment is a monovalent group of formula

where a in an integer in the range of about 4 to about 20 or is a divalent group of formula

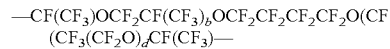

where the sum (b+d) is an integer in the range of about 4 to about 15.

Preparatory Example 1

Synthesis of $H_3CO(CO)$—HFPO—$(CO)OCH_3$—$OCH_3$—Method 1

A dimethyl ester of poly(hexafluoropropylene oxide) was prepared using $F(CO)CF_2CF_2(CO)F$ as an starting material according to the method reported in U.S. Pat. No. 3,250,807 (Fritz, et al.) which provides the HFPO oligomer bis-acid fluoride. The HFPO oligomer bis-acid fluoride was subjected to methanolysis and purification by removal of lower boiling materials by fractional distillation as described in U.S. Pat. No. 6,923,921 (Flynn, et. al.). The resulting material was of formula $H_3CO(CO)CF(CF_3)(OCF_2CF(CF_3))_bOCF_2CF_2CF_2CF_2O(CF(CF_3)CF_2O)_dCF(CF_3)(CO)OCH_3$ where the sum (b+d) is an integer in the range of about 4 to about 15. This formula is also be referred to interchangeably as $H_3CO(CO)$—HFPO—$(CO)OCH_3$ or HFPO—$((CO)OCH_3)_2$ or HFPO dimethyl ester or HFPO-DME.

More specifically, a 600-mL jacketed reactor, which is commercially available under the trade designation PARR from Parr Instrument Company (Moline, Ill.), was charged with KF (15.1 grams, 0.26 moles) and tetraglyme (125 grams). The reactor was stirred, evacuated to 0.033 atmosphere vacuum using a vacuum pump and cooled to 4° C. A charge of perfluorosuccinyl fluoride (85 grams, 0.44 moles) that was obtained from Exfluor Research Corporation (Austin, Tex.) was added to the reactor. External cooling was used to cool the contents of the reactor to 0° C. before adding hexafluoropropylene oxide (482 grams, 2.9 moles) slowly over 5 hours. The hexafluoropropylene oxide was obtained from DuPont (Wilmington, Del.). The maximum pressure was 2.38 atmospheres and an exotherm of 8° C. resulted. After addition was completed, the reactor was warmed to room temperature and nitrogen was used to break the 0.033 atmosphere reactor vacuum and to increase the pressure within the reactor to atmospheric pressure.

The crude mixture of 690 grams was drained from the reactor and reacted with methanol (120 grams, 3.8 moles) to convert the diacid fluoride ends to dimethyl ester end groups. The fluorochemical crude product was isolated by adding a fluorinated solvent (300 grams), which is commercially available under the trade designation FC77 FLUORINERT form 3M Company (Saint Paul, Minn.), and by water washing twice. The lower fluorochemical phase was stripped of fluorinated solvent and the product was isolated by taking a cut that boiled from 130-190° C. The yield was 390 grams (71 percent) of HFPO dimethyl ester having a number average molecular weight of 1250 grams/mole and 96 percent functionality determined by NMR end group analysis.

Preparatory Example 2

Synthesis of $H_3CO(CO)$—HFPO—$(CO)OCH_3$—Method 2

A dimethyl ester of poly(hexafluoropropylene oxide) was prepared from the oligomerization reaction of hexafluoropropylene oxide (5900 grams, 35.5 moles) in the presence of perfluorosuccinyl fluoride (511 grams, 2.6 moles) and KF (102 grams, 1.75 moles) in tetraglyme (1008 grams) at 5° C. in essentially the same manner as described in Preparatory Example 1. The hexafluoropropylene oxide was added at a rate of 1500 grams/hour. After the oligomerization reaction was completed, methanol was added and HFPO dimethyl ester was vacuum distilled for a yield of 80 percent. The molecular weight was 2400 grams/mole.

Preparatory Example 3

Synthesis of $H_2NCH_2CH_2$—NH(CO)—HFPO—(CO)NH—$CH_2CH_2NH_2$

A 1 L 3-necked round bottom flask that was equipped with a magnetic stir bar, $N_2$ inlet and reflux condenser was charged with $NH_2$—$CH_2CH_2$—$NH_2$ (420.0 grams, 7 moles) under $N_2$ atmosphere. The charge was heated to 75° C. Then the 150.0 grams HFPO dimethyl ester ($8.75 \times 10^{-2}$ moles) of Preparatory Example 1 was added dropwise at 75° C. over a period of 180 minutes. The reaction mixture was stirred under $N_2$ atmosphere for 12 hours and the progress of the reaction was monitored by IR spectroscopy. After the disappearance of the ester peak at 1792 cm$^{-1}$ and appearance of the NH—C=O peak at 1719 cm$^{-1}$, the reaction mixture was poured onto a separation funnel and the lower portion was collected in a flask and dried under high vacuum for another 8 hours. The viscous oil obtained was used as such.

Preparatory Examples 4a-4b

Synthesis of polydimethlylsiloxane diamine

Polydimethylsiloxane diamines of the following formula

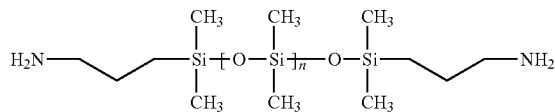

can be prepared using a procedure similar described in U.S. Pat. No. 5,214,119. Preparatory Example 4a had a number average molecular weight of about 25,000 grams/mole. Preparatory Example 4b had a number average molecular weight of about 5,000 grams/mole.

Preparatory Example 5

Synthesis of 25K Oxalylamino Ester Terminated Silicone Compound

Oxalylamino ester terminated polydimethylsiloxane was prepared as described in U.S. Pat. No. 7,501,184 (Leir et al.). More specifically, sieve dried diethyloxalate (DEO) (398.6 grams) was weighed into a 12-L, 3-neck flask. The flask was sealed and the headspace purged with argon. While vigorously stirring the DEO, the polydimethylsiloxane diamine of Preparatory Example 4a (6,818.7 grams) was added over about a period of 75 minutes. The reaction flask was set up for distillation. The temperature was slowly increased from ambient to 165° C. and the excess DEO as well as the ethanol by-product were distilled out of the reaction product under high vacuum. The product thus obtained was a viscous, clear and colorless liquid.

Preparatory Example 6

Synthesis of 5K Oxalylamino Ester Terminated Silicone Compound

The procedure of Preparatory Example 5 was repeated using the polydimethylsiloxane diamine of Preparatory Example 4b.

Preparatory Example 7

Synthesis of 1K Oxalylamino Ester Terminated Silicone Compound

The procedure of Preparatory Example 5 was repeated using the polydimethylsiloxane diamine having a number average molecular weight of 1,000 grams/mole that was purchased from Wacker Chemical Company (Adrian, Mich.) under the trade designation FLUID NH 15 D PDMS.

Preparatory Example 8

Synthesis of $H_2N[CH_2CH_2O]_2CH_2CH_2NH(CO)$—HFPO—$(CO)NHCH_2CH_2[OCH_2CH_2]_2NH_2$ A 1000-mL 3-necked round bottom flask was equipped with a magnetic stir bar, $N_2$ inlet and reflux condenser. The flask was charged with $NH_2CH_2CH_2$—O—$CH_2CH_2$—O—$CH_2CH_2NH_2$ (triethyleneglycol diamine—TEGDA) (52.9 grams, 0.3 moles) under $N_2$ atmosphere. The charge was heated to 75° C. The HFPO-DME of Preparatory Example 1 (5.0 grams, $3.75 \times 10^{-2}$ moles) was added dropwise to this solution at 75° C. over a period of 180 minutes. The reaction mixture was stirred under $N_2$ atmosphere for 12 hours and was monitored by IR. After the disappearance of ester peak, the reaction mixture was poured onto a separation funnel and the lower portion was collected in a flask and dried under high vacuum for another 8 hours. The viscous oil obtained was used as such.

Preparatory Example 9

Into a 250-mL 3-necked flask was weighed 64.9 grams of dry DEO. The flask was fitted with a stirrer and a gentle argon sweep of the flask was started. With vigorous stirring of the DEO, the fluorinated amine of Preparatory Example 8 (150.0 grams) was added dropwise from an addition funnel over about a period of 120 minutes. After all of the fluorinated amine was added, the additional funnel was removed and the flask was set up for distillation. Under high vacuum, the temperature was slowly increased from ambient to 165° C. The excess DEO and ethanol formed during the reaction were distilled out of the flask. About 147.38 grams (94.2 percent of the theoretical yield) of the oxalylamino ester terminated precursor product was isolated. Back titration of the product with ethanolamine and 1N HCl showed an ester equivalent weight of 1,950 grams/equivalent.

Preparatory Example 10

Synthesis of di(methyl ethyl ketoxime) oxalate

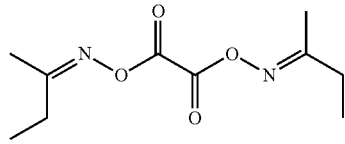 [SMILES: CC/C(C)=N\OC(=O)C(=O)O/N=C(\C)CC]

To a 1 L flask equipped with an overhead stirrer, addition funnel, ice bath, temperature probe, and nitrogen inlet was added 2-butanone oxime (93.23 grams, 1.070 moles) and tert-butyl methyl ether (500 mL). The contents were cooled to 10° C., and oxalyl chloride (67.9 grams, 0.535 moles) was added over 30 minutes while maintaining the internal temperature below 15° C. Triethylamine (108 grams, 1.07 moles) was then added dropwise over 30 minutes with external cooling to maintain the internal temperature below 30° C. Enough water was added to dissolve the resulting solids, and then the aqueous layer was drawn off. The organic layer was washed twice with 0.1N HCl and once with 2M sodium carbonate, after which it was dried over $MgSO_4$ and filtered through a pad of Celite. The solvent was removed on a rotary evaporator to afford 120 grams of di(methyl ethyl ketoxime) oxalate as a clear, colorless oil. $^1$H NMR ($CDCl_3$) was consistent with the proposed structure. The material included a mixture of stereoisomers.

Example 1

In a vial, $H_2NCH_2CH_2$—NH(CO)—HFPO—(CO)NH—$CH_2CH_2NH_2$ of Preparatory Example 3 (0.6301 grams) was dissolved in tert-butyl methyl ether (23.0 grams). Preparatory Example 5 (8.37 grams) having a number average molecular weight of about 25,000 grams/mole was added and the mixture was mixed on a roller for one day under ambient lab conditions (the resulting polymer gelled out of solution). The reaction mixture was mixed on a roller for three days under ambient lab conditions. The polymer was dried in an aluminum weighing dish in a fume hood and then overnight at 60° C. The polymer obtained was a clear, colorless, moderately tough elastomer. Average inherent viscosity (IV) of the polymer was measured at 27° C. using a Cannon-Fenske viscometer (Model No. 50 P296, obtained from Cannon Instrument Company, State College, Pa.) in a tetrahydrofuran solution at 27° C. at a concentration of 0.2 grams/dL. The inherent viscosity value (0.722 dL/gram) was the average of 3 or more runs. The polymer had a refractive index of 1.3981.

Example 2

In a vial, $H_2NCH_2CH_2$—NH(CO)—HFPO—(CO)NH—$CH_2CH_2NH_2$ of Preparatory Example 3 (1.0055 grams) was dissolved in tert-butyl methyl ether (10.0 grams). The oxalylamino-containing silicone of Preparatory Example 6 (3.4992 grams) having a number average molecular weight of about 5,000 grams/mole was added and mixed on a roller for one day under ambient lab conditions (the resulting polymer gelled out of solution). The reaction mixture was mixed on a roller for three days under ambient lab conditions. The polymer was dried in an aluminum weighing dish in a fume hood and then overnight at 60° C. The polymer obtained was a clear, colorless, tough elastomer.

Example 3

In a vial, $H_2NCH_2CH_2$—NH(CO)—HFPO—(CO)NH—$CH_2CH_2NH_2$ of Preparatory Example 3 (0.9946 grams) was dissolved in tert-butyl methyl ether (2.3 grams). The oxalylamino-containing silicone of Preparatory Example 7 (0.6499 grams) having a number average molecular weight of about 1,000 grams/mole was added and mixed on a roller for one day under ambient lab conditions (the resulting polymer gelled out of solution). The reaction mixture was mixed on a roller for one day under ambient laboratory conditions. The reaction mixture was mixed for four days in a Launder-O-Meter at 50° C. followed by one more day on a roller for one day under ambient lab conditions. The polymer was dried in an aluminum weighing dish in a fume hood and then overnight at 60° C. The polymer obtained was a clear, colorless, tough plastic. Average inherent viscosity (IV) of the polymer was measured at 27° C. using a Cannon-Fenske viscometer (Model No. 50 P296, obtained from Cannon Instrument Company, State College, Pa.) in a tetrahydrofuran solution at 27° C. at a concentration of 0.2 grams/dL. The inherent viscosity value (0.160 dL/g) was an average of 3 or more runs. The polymer had a refractive index of 1.3895.

Example 4

In a vial, the compound of Preparatory Example 9 (5.8605 grams) was dissolved in trifluoroethanol (12.5 grams) in a first vial. Ethylene diamine (0.0452 grams) and a polydimethylsiloxane amine with a number average molecular weight of about 1,000 grams/mole that is commercially available from Wacker Silicones (Adrian, Mich.) under the trade designation FLUID NH 15 D PDMS (0.7566 grams) were dissolved in 12.5 grams of trifluoroethanol in a second vial. The content of the first vial was combined with the content of the second vial and the resulting reaction mixture was mixed for four days in a Launder-O-Meter at 50° C. The polymer was dried in a Teflon tray in a fume hood and then overnight at 60° C. The polymer obtained was a clear, colorless, elastomer.

Example 5

In a vial, $H_2NCH_2CH_2$—NH(CO)—HFPO—(CO)NH—$CH_2CH_2NH_2$ of Preparatory Example 3 (1.0576 grams) and PDMS diamine of Preparatory Example 4b (2.9362 grams) were dissolved in 10 grams of tent-butyl methyl ether. The di(methyl ethyl ketoxime) oxalate (0.2630 grams) of Preparatory Example 10 was added and mixed on a roller for one day under ambient lab conditions followed by four days in a Launder-O-Meter at 50° C. The polymer was dried in a Teflon tray in a fume hood and then overnight at 60° C. The polymer obtained was a hazy, slightly yellow, tough elastomer.

We claim:

1. A copolymer comprising a product of a reaction mixture comprising:
   a) a fluorinated oxalylamino-containing compound comprising at least one perfluoropolyether segment and at least two monovalent terminal groups of Formula (I)

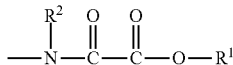
(I)

wherein
   each $R^1$ is independently an alkyl, haloalkyl, aralkyl, substituted aralkyl, alkenyl, aryl, substituted aryl, or imino of formula $-N=CR^4R^5$;
   each $R^2$ is independently hydrogen, alkyl, aralkyl, or aryl;
   $R^4$ is hydrogen, alkyl, aralkyl, substituted aralkyl, aryl, or substituted aryl;
   $R^5$ is alkyl, aralkyl, substituted aralkyl, aryl, or substituted aryl; and
   b) a silicone-based amine having a polydiorganosiloxane segment and having at least two primary amino groups, two secondary amino groups, or a mixture thereof.

2. The copolymer of claim 1, wherein the fluorinated oxalylamino-containing compound is of Formula (II)

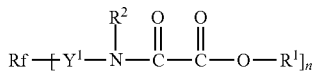
(II)

wherein
   Rf is a perfluoropolyether group;
   each $Y^1$ is independently (a) a heteroalkylene, (b) alkylene, or (c) a carbonylamino group linking a first group to a second group, wherein the first group and the second group are each independently a heteroalkylene or alkylene, or (d) a combination thereof; and
   n is an integer greater than or equal to at least 2.

3. The copolymer of claim 2, wherein the fluorinated oxalylamino-containing compound is of Formula (IIa)

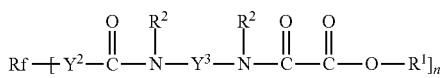
(IIa)

wherein
   each $Y^1$ in Formula (II) is equal to $-Y^2-(CO)-NH-Y^3-$ in Formula (IIa);
   each $Y^2$ is independently a single bond, heteroalkylene, alkylene, or combination thereof; and
   each $Y^3$ is independently a heteroalkylene, alkylene, or combination thereof.

4. The copolymer of claim 1, wherein the fluorinated oxalylamino-containing compound is of Formula (III)

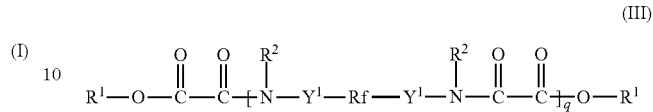
(III)

wherein
   Rf is a perfluoropolyether group;
   each $Y^1$ is independently (a) a heteroalkylene, (b) alkylene, (c) a carbonylamino group linking a first group to a second group, wherein the first group and the second group are each independently a heteroalkylene or alkylene, or (d) a combination thereof; and
   q is an integer equal to at least 1.

5. The copolymer of claim 4, wherein the fluorinated oxalylamino-containing compound of Formula (IIIa)

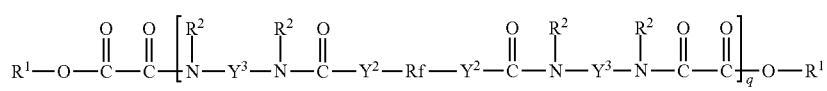
(IIIa)

wherein
   each $Y^1$ in Formula (III) is equal to $-Y^2-(CO)-NH-Y^3-$ in Formula (IIIa);
   each $Y^2$ is independently a single bond, heteroalkylene, alkylene, or combination thereof; and
   each $Y^3$ is independently a heteroalkylene, alkylene, or combination thereof.

6. The copolymer of claim 1, wherein the silicone-based amine is of Formula (VIII)

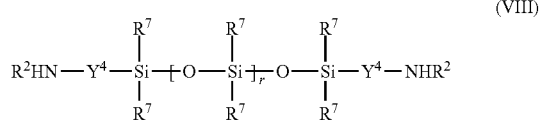
(VIII)

wherein
   each $Y^4$ is independently an alkylene, aralkylene, or a combination thereof;
   each $R^7$ is independently an alkyl, haloalkyl, aralkyl, substituted aralkyl, alkenyl, aryl, or substituted aryl; and
   r is an integer greater than or equal to 1.

7. The copolymer of claim 1, wherein the reaction mixture further comprises a second amine compound of Formula (XVI)

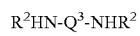
$R^2HN-Q^3-NHR^2$ (XVI)

wherein
   $Q^3$ is (a) a heteroalkylene, (b) alkylene, (c) fluorinated alkylene, (d) arylene, (e) a carbonylamino group linking a first group to a second group, where each first group and second group is independently a heteroalkylene, alkylene, fluorinated alkylene, arylene, or a combination thereof, (f) part of a heterocyclic group that includes R⁸ and a nitrogen to which R⁸ is attached, or (g) a combination thereof; and each R⁸ is independently hydrogen, alkyl, aralkyl, aryl, or part of a heterocyclic group that includes Q³ and the nitrogen atom to which R⁸ is attached.

8. A copolymer comprising a product of a reaction mixture comprising:

a) a silicone-based oxalylamino-containing compound comprising at least one polydiorganosiloxane segment and at least two monovalent terminal groups of Formula (I)

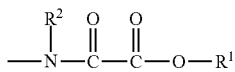
(I)

wherein
each R¹ is independently an alkyl, haloalkyl, aralkyl, substituted aralkyl, alkenyl, aryl, substituted aryl, or imino of formula —N═CR⁴R⁵;

each R² is independently hydrogen, alkyl, aralkyl, or aryl;

R⁴ is hydrogen, alkyl, aralkyl, substituted aralkyl, aryl, or substituted aryl;

R⁵ is an alkyl, aralkyl, substituted aralkyl, aryl, or substituted aryl; and b) a fluorinated amine having a perfluoropolyether segment and having at least two primary amino groups, two secondary amino groups, or a mixture thereof.

9. The copolymer of claim 8, wherein the fluorinated amine is of Formula (IV)

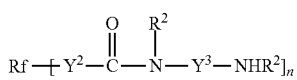
(IV)

wherein
Rf is a perfluoropolyether group; and
each Y¹ is independently (a) a heteroalkylene, (b) alkylene, or (c) a carbonylamino group linking a first group to a second group, wherein the first group and the second group are each a heteroalkylene or alkylene, or (d) a combination thereof and
n is an integer equal to at least 1.

10. The copolymer of claim 9, wherein the fluorinated amine is of Formula (V)

(V)

wherein
each Y¹ in Formula (IV) is equal to —Y²—(CO)—NH—Y³— in Formula (V);

each Y² is independently a single bond, heteroalkylene, alkylene, or combination thereof and each Y³ is independently a heteroalkylene, alkylene, or combination thereof.

11. The copolymer of claim 8, wherein the silicone-based oxalylamino-containing compound is of Formula (IX)

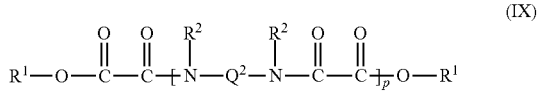
(IX)

wherein
group Q² comprises a polydiorganosiloxane segment; and
p is an integer equal to at least 1.

12. The copolymer of claim 11, wherein Q² is a divalent group of Formula (X)

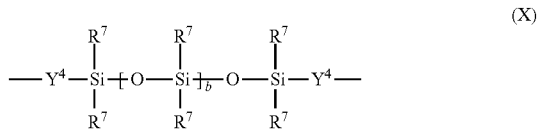
(X)

wherein
each Y⁴ is independently an alkylene, aralkylene, or a combination thereof;

each R⁷ is independently an alkyl, haloalkyl, aralkyl, substituted aralkyl, alkenyl, aryl, or substituted aryl; and b is an integer greater than or equal to at least 1.

13. The copolymer of claim 8, wherein the reaction mixture further comprises a second amine compound of Formula (XVI)

R²HN-Q³-NHR²    (XVI)

wherein
Q³ is (a) a heteroalkylene, (b) alkylene, (c) fluorinated alkylene, (d) arylene, (e) a carbonylamino group linking a first group to a second group, where each first group and second group is independently a heteroalkylene, alkylene, fluorinated alkylene, arylene, or a combination thereof, (f) part of a heterocyclic group that includes R⁸ and a nitrogen to which R⁸ is attached, or (g) a combination thereof; and each R⁸ is independently hydrogen, alkyl, aralkyl, aryl, or part of a heterocyclic group that includes Q³ and the nitrogen atom to which R⁸ is attached.

14. A copolymer comprising a product of a reaction mixture comprising:

a) an oxalate compound of Formula (VI)

(VI)

wherein
each R¹ is independently an alkyl, haloalkyl, aralkyl, substituted aralkyl, alkenyl, aryl, substituted aryl, or imino of formula —N═CR⁴R⁵;

R⁴ is hydrogen, alkyl, aralkyl, substituted aralkyl, aryl, or substituted aryl; and R⁵ group is alkyl, aralkyl, substituted aralkyl, aryl, or substituted aryl;

b) a fluorinated amine having a perfluoropolyether segment and having at least two primary amino groups, two secondary amino groups, or a mixture thereof; and c) a silicone-based amine having a polydiorganosiloxane segment and at least two primary amino groups, at least two secondary amino groups, or at least one primary amino group plus at least one secondary amino group.

15. A copolymer comprising at least one group of Formula (XI)

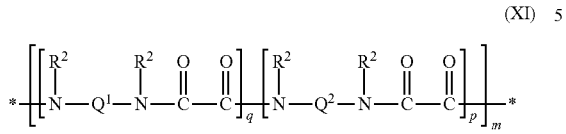
(XI)

wherein
- each group $Q^1$ comprises a perfluoropolyether segment;
- each group $Q^2$ comprises a polydiorganosiloxane segment;
- each $R^2$ is independently hydrogen, alkyl, aralkyl, or aryl;
- each variable q, p, and m is independently an integer equal to at least 1; and
- each asterisk denotes a site of attachment to another group in the copolymer.

16. The copolymer of claim 15, wherein $Q^2$ is a divalent group of Formula (X)

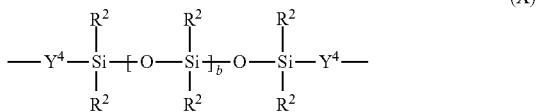
(X)

wherein
- each $Y^4$ is independently an alkylene, aralkylene, or a combination thereof;
- each $R^2$ is independently an alkyl, haloalkyl, aralkyl, alkenyl, aryl, or aryl substituted with an alkyl, alkoxy, or halo, wherein at least 50 percent of the $R^2$ groups are methyl; and
- b is an integer greater than or equal to at least 1.

17. The copolymer of claim 15, wherein $Q^1$ is a divalent group of Formula (XII)

$$—Y^1Rf—Y^1—$$ (XII)

wherein
- each $Y^1$ is independently (a) a heteroalkylene, (b) alkylene, or (c) a carbonylamino group linking a first group to a second group, wherein the first group and the second group are each a heteroalkylene or alkylene, or (d) a combination thereof and
- Rf is a perfluoropolyether group.

18. The copolymer of claim 16, wherein $Q^1$ is the divalent group of Formula (XIII)

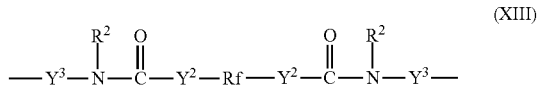
(XIII)

wherein
- each $Y^2$ is independently a single bond, heteroalkylene, alkylene, or combination thereof and
- each $Y^3$ is independently a heteroalkylene, alkylene, or combination thereof.

19. The copolymer of claim 15, wherein the copolymer further comprises at least one divalent group of Formula (XIV)

(XIV)

wherein
- $Q^3$ is (a) a heteroalkylene, (b) alkylene, (c) fluorinated alkylene, (d) arylene, (e) a carbonylamino group linking a first group to a second group, where each first group and second group is independently a heteroalkylene, alkylene, fluorinated alkylene, arylene, or a combination thereof, (f) part of a heterocyclic group that includes $R^8$ and a nitrogen to which $R^8$ is attached, or (g) a combination thereof; and
- each $R^8$ is independently hydrogen, alkyl, aralkyl, aryl, or part of a heterocyclic group that includes $Q^3$ and the nitrogen atom to which $R^8$ is attached.

20. The copolymer of claim 15, wherein at least one of p or q is equal to 1.

21. The copolymer of claim 15, wherein Rf is of formula

—CF(CF$_3$)[OCF$_2$CF(CF$_3$)]$_b$OCF$_2$—R$^6$—CF$_2$O[CF(CF$_3$)CF$_2$O]$_d$CF(CF$_3$)— wherein
- $R^6$ is a perfluoroalkylene group; and
- b and d are integers with a sum in the range of 0 to 35.

* * * * *

UNITED STATES PATENT AND TRADEMARK OFFICE
CERTIFICATE OF CORRECTION

PATENT NO. : 8,552,124 B2
APPLICATION NO. : 13/514339
DATED : October 8, 2013
INVENTOR(S) : Richard G Hansen et al.

It is certified that error appears in the above-identified patent and that said Letters Patent is hereby corrected as shown below:

In the Specification:

Column 3
Line 53, delete "carbocylic" and insert -- carbocyclic --, therefor.

Column 4
Line 34 (approx.), delete "-$(C_XF_{2X}-O-)_y$-" and insert -- -$(C_XF_{2X}-O)_y$- --, therefor.

Line 44 (approx.), delete ""polydiorganosilioxane"" and insert -- "polydiorganosiloxane" --, therefor.

Column 6
Line 11 (approx.), delete "trifluorethyl" and insert -- trifluoroethyl --, therefor.

Column 8
Line 60, delete "$R^2$," and insert -- $R^1$, --, therefor.

Column 12
Line 52, after "the" insert -- group $-Y^1-Rf-Y^1-$ in Formula (III). The silicone-based amine can be a diamine of Formula (VII) --.

Column 15
Line 33 (approx.), delete "triethtylene" and insert -- triethylene --, therefor.

Line 40, delete "(VXI)" and insert -- (XVI) --, therefor.

Lines 51-60, delete "When group . . . attached." and insert the same on Col. 15, line 52, as a new paragraph.

Signed and Sealed this
Twentieth Day of May, 2014

Michelle K. Lee
*Deputy Director of the United States Patent and Trademark Office*

CERTIFICATE OF CORRECTION (continued)
U.S. Pat. No. 8,552,124 B2

Column 16
Line 62, delete "polyoxypropropylene" and insert -- polyoxypropylene --, therefor.

Column 18
Line 19, delete "tent-butyl" and insert -- tert-butyl --, therefor.

Column 21
Line 27 (approx.), delete "$R^8NH-Q^3-NR^8$" and insert -- $R^8NH-Q^3-NHR^8$ --, therefor.

Column 24
Line 45, delete "polydioroganosiloxane" and insert -- polyorganosiloxane --, therefor.

Column 28
Line 6, delete "$R^8NH-Q^3-NHR^8$" and insert -- $R^8HN-Q^3-NHR^8$ --, therefor.

Column 29
Line 4, delete "R2" and insert -- $R^2$ --, therefor.

Column 30
Line 26 (approx.), before "Method 1" delete "$OCH_3$-".

Column 31
Line 44 (approx.), delete "polydimethlylsiloxane" and insert -- polydimethylsiloxane --, therefor.

In the Claims:

Column 36
Line 36, in Claim 5, delete "(Ma);" and insert -- (IIIa); --, therefor.

Column 37
Line 46, in Claim 9, delete "thereof" and insert -- thereof; --, therefor.

Line 62, in Claim 10, delete "thereof" and insert -- thereof; --, therefor.

Column 39
Line 39, in Claim 17, delete "-$Y^1Rf-Y^1$-" and insert -- -$Y^1$-Rf-$Y^1$- --, therefor.

Line 45, in Claim 17, delete "thereof" and insert -- thereof; --, therefor.

Column 40
Line 12, in Claim 18, delete "thereof" and insert -- thereof; --, therefor.